United States Patent
Itou

(10) Patent No.: US 8,924,757 B2
(45) Date of Patent: Dec. 30, 2014

(54) ELECTRICAL APPARATUS AND POWER SUPPLY CONTROL METHOD

(75) Inventor: Shigeharu Itou, Osaka (JP)

(73) Assignee: Kyocera Mita Corporation, Osaka (JP)

( * ) Notice: Subject to any disclaimer, the term of this patent is extended or adjusted under 35 U.S.C. 154(b) by 725 days.

(21) Appl. No.: 13/194,097

(22) Filed: Jul. 29, 2011

(65) Prior Publication Data
US 2012/0030491 A1    Feb. 2, 2012

(30) Foreign Application Priority Data

Jul. 30, 2010    (JP) ................. 2010-171570
Jul. 30, 2010    (JP) ................. 2010-171698

(51) Int. Cl.
*G06F 1/00* (2006.01)
*H04N 1/00* (2006.01)
*G06F 1/32* (2006.01)
*G03G 15/00* (2006.01)

(52) U.S. Cl.
CPC .......... *G06F 1/3203* (2013.01); *H04N 1/00896* (2013.01); *G06F 1/3228* (2013.01); *H04N 2201/0094* (2013.01); *G03G 15/5004* (2013.01)
USPC ........................................................ 713/323

(58) Field of Classification Search
CPC ................................................... G06F 1/3203
USPC ........................................................ 713/323
See application file for complete search history.

(56) References Cited

U.S. PATENT DOCUMENTS

| | | | |
|---|---|---|---|
| 2007/0009154 A1* | 1/2007 | Iwabayashi et al. | 382/176 |
| 2008/0144086 A1* | 6/2008 | Shibao | 358/1.15 |
| 2010/0166442 A1* | 7/2010 | Yamada | 399/37 |
| 2011/0004776 A1* | 1/2011 | Tanaka | 713/323 |

FOREIGN PATENT DOCUMENTS

JP    2000-227739    8/2000

\* cited by examiner

*Primary Examiner* — Mohammed Rehman
*Assistant Examiner* — Austin Hicks
(74) *Attorney, Agent, or Firm* — Gerald E. Hespos; Michael J. Porco; Matthew T. Hespos

(57) ABSTRACT

An electrical apparatus has a controller for switching between a normal power mode and power saving modes. A receiver receives instructions for a manipulation on the apparatus. A switch controller switches to a first power saving mode when no instruction for manipulation is received within a first standby time in the normal power mode, switches to a second and lower power saving mode when no instruction for manipulation is received and the time reaches a preset second standby time in the first power saving mode, switches to the normal power mode when an instruction for manipulation is received when the apparatus is in the first or second power saving mode, and switches to the second or a third power saving mode for supplying less power than the first power saving mode but more than the second when the time reaches the first standby time if a predetermined condition is satisfied.

13 Claims, 13 Drawing Sheets

ELECTRICAL APPARATUS AND POWER SUPPLY CONTROL METHOD

BACKGROUND OF THE INVENTION

1. Field of the Invention

The present invention belongs to the technical field of electrical apparatuses such as image forming apparatuses for forming an image on a recording medium and personal computers and, particularly relates to the technology of switching power modes in an electrical apparatus with a normal power mode for supplying power to respective parts of the electrical apparatus and a power saving mode for reducing a power supply amount as compared with the normal power mode.

2. Description of the Related Art

As a power saving technology in electrical apparatuses including image forming apparatuses for forming an image on a recording medium such as copiers and facsimile machines and personal computers, a technology of providing a power saving mode for reducing the amount of power supplied to respective parts of the electrical apparatus in addition to a normal power mode for supplying power to the respective parts is widely used. In this technology, a control is executed to switch the power supply mode of the electrical apparatus from the normal power mode to the power saving mode when the electrical apparatus has not operated for a predetermined time or when an instruction to switch to the power saving mode is input to the electrical apparatus.

For example, there has been proposed a technology of providing a storage unit for storing fixing temperatures (standby states) when no printing operation is performed in an image forming apparatus and successively selecting the standby states from the storage unit. The standby state means a state where power consumption can be suppressed although a time required to reach a fixing temperature at which an image forming operation is possible becomes longer as a non-printing time becomes longer.

For a user who does not use a printing function provided in an image forming apparatus much, for example, by making only several copies for every long period of time, it is thought not to be much advantageous to maintain a certain high fixing temperature. Even if it takes a relatively long time to increase the fixing temperature when the printing function with less frequency is utilized, an advantage brought about by reducing power consumption by reducing the supply of power required to maintain the fixing temperature is thought to be high.

However, in the above technology, the standby states corresponding to the non-printing time are successively selected from the storage unit. Accordingly, even if it is repeated that the image forming apparatus is not used for a long time after being used only for a short time, power has been consumed more than a little by the standby states successively selected until the long time elapses. That is, there has been room for improvement in reducing power consumption in electrical apparatuses.

SUMMARY OF THE INVENTION

An object of the present invention is to provide an electrical apparatus and a power supply control method capable of further saving power according to a used state.

In order to accomplish this object, one aspect of the present invention is directed to an electrical apparatus, comprising a power supply controller for switching a power supply mode between a normal power mode for supplying power to respective parts of the electrical apparatus, a first power saving mode for reducing a power supply amount as compared with the normal power mode and a second power saving mode for reducing the power supply amount as compared with the first power saving mode; a time meter which starts measuring time when the execution of an operation of the electrical apparatus based on a manipulation on the electrical apparatus is completed in a state where the electrical apparatus is set in the normal power mode; a manipulation instruction receiver for receiving an instruction for a manipulation on the electrical apparatus; and a switch controller for instructing a switch to the first power saving mode to the power supply controller when a state where no instruction for the manipulation is received by the manipulation instruction receiver continues and the time measured by the time meter reaches a preset first standby time in the normal power mode, a switch to the second power saving mode to the power supply controller when the state where no instruction for the manipulation is received by the manipulation instruction receiver continues and the time measured by the time meter reaches a preset second standby time in the first power saving mode, and a switch from the first or second power saving mode to the normal power mode when an instruction for the manipulation is received by the manipulation instruction receiver in a state where the electrical apparatus is set in the first or second power saving mode; wherein the switch controller omits the first power saving mode and instructs a switch to the second power saving mode or omits the first power saving mode and instructs a switch to a third power saving mode as a power supply mode in which the power supply amount is less than in the first power saving mode, but more than in the second power saving mode when the time measured by the time meter reaches the first standby time if a predetermined condition is satisfied.

Another aspect of the present invention is directed to a power supply control method, comprising a time measuring step of starting measuring time when the execution of an operation of an electrical apparatus based on an instruction for a manipulation on the electrical apparatus is completed in a normal power mode for supplying power to respective parts of the electrical apparatus; a first switch control step of switching from the normal power mode to a first power supply mode for reducing the amount of power supplied to the electrical apparatus as compared with the normal power mode when a state where no instruction for the manipulation is given continues and the time measured in the time measuring step reaches a preset first standby time in the normal power mode; a second switch control step of switching from the first power saving mode to a second power supply mode for reducing a power supply amount to the electrical apparatus as compared with the first power saving mode when the state where no instruction for the manipulation is given continues and the time measured in the time measuring step reaches a preset second standby time in the first power saving mode; and a third switch control step of switching from the first or second power saving mode to the normal power mode when an instruction for the manipulation is given in the first or second power saving mode; wherein the first switch control step includes a step of omitting the first power saving mode and switching to the second power saving mode or omitting the first power saving mode and switching to a third power saving mode as a power supply mode in which the power supply amount is less than in the first power saving mode, but more than in the second power saving mode when the time measured in the time measuring step reaches the first standby time if a predetermined condition is satisfied.

These and other objects, features and advantages of the present invention will become more apparent upon reading the following detailed description along with the accompanying drawings.

DETAILED DESCRIPTION OF THE PREFERRED EMBODIMENTS

First Embodiment

Figure 1:
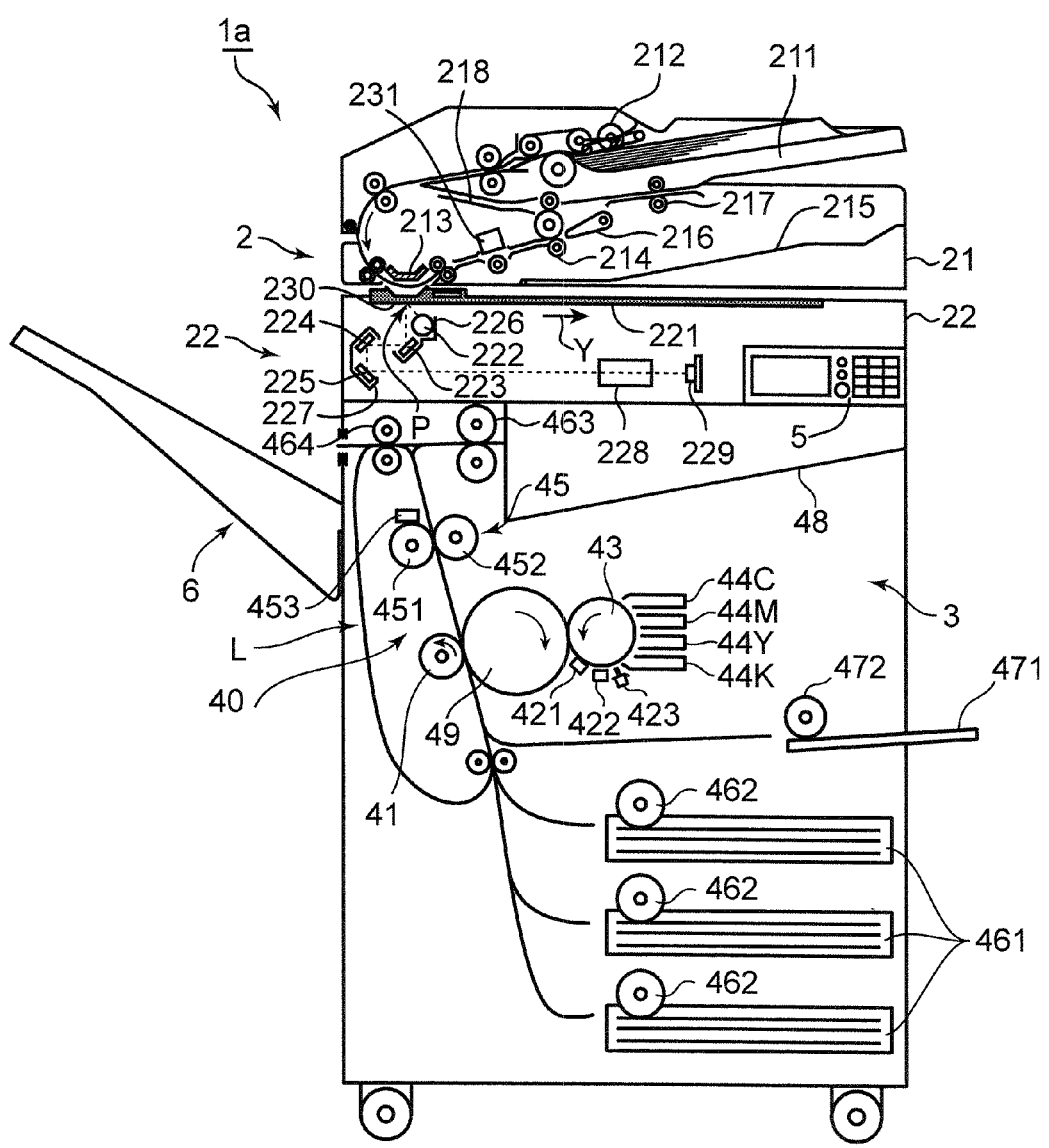
FIG. 1 is a sectional view of a complex machine according to a first embodiment.

A first embodiment of an electrical apparatus and a power supply control method according to the present invention is described, taking an image forming apparatus as an example. A complex machine including a color copy function, a scanner function, a facsimile function, a printer function and other functions is illustrated as this image forming apparatus. FIG. 1 is a sectional view of this complex machine.

A complex machine 1a includes an image reader 2, an apparatus main body 3 and a stack tray 6 arranged on the left side of the apparatus main body 3

The image reader 2 includes a document feeder unit 21, a scanner unit 22, a CIS 231 and a user interface unit 5.

The document feeder unit 21 includes an ADF (Automatic Document Feeder), a document tray 211, a pickup roller 212, a platen 213, a discharge roller 214 and a discharge tray 215.

Documents to be read are placed on the document tray 211. The documents placed on the document tray 211 are picked up one by one by a pickup roller 212 and successively conveyed to the platen 213 with a gap between two successive documents. The documents having gone through the platen 213 are successively discharged onto the discharge tray 214 by the discharge roller 214.

An unillustrated timing sensor for detecting a sheet is arranged at a predetermined position facing the circumferential surface of the platen 213 before a reading position P in a document conveying direction, and determines a conveying timing of the document to the reading position P in accordance with an output signal of the timing sensor. This timing sensor is, for example, composed of a photointerrupter.

The scanner unit 22 optically reads a document image and generates image data. The scanner unit 22 includes a glass 221, a light source 222, a first mirror 223, a second mirror 224, a third mirror 225, a first carriage 226, a second carriage 227, an imaging lens 228 and a CCD (Charge Coupled Device) 229, wherein the light source 222 and the first mirror 223 are supported by the first carriage 226 and the second mirror 224 and the third mirror 225 are supported by the second carriage 227.

A white fluorescent lamp such as a cold cathode fluorescent lamp is used as the light source 222, and the scanner unit 22 is so constructed that light from a document is introduced to the CCD 229 by the first mirror 223, the second mirror 224, the third mirror 225, the first carriage 226, the second carriage 227 and the imaging lens 228.

A document reading method of the image reader 2 includes a flat bed reading mode for reading a document placed on the glass 221 by the scanner unit 22 and an ADF reading mode for picking up a document by the document feeder unit 21 (ADF) and reading the document during the conveyance of the document.

In the flat bed reading mode, the light source 222 irradiates light to a document placed on the glass 221 and reflected light of one line in a main scanning direction is successively reflected by the first mirror 223, the second mirror 224 and the third mirror 225 and incident on the imaging lens 228. The light incident on the imaging lens 228 is imaged on a light receiving surface of the CCD 229.

The CCD 229 is a linear image sensor and simultaneously processes image data of one line of the document. The first carriage 226 and the second carriage 227 are movable in a direction (sub scanning direction, direction of arrow Y) orthogonal to the main scanning direction. When the reading of one line is completed, the first carriage 226 and the second carriage 227 move in the sub scanning direction to read the next line.

In the ADF reading mode, the document feeder unit 21 picks up documents placed on the document tray 211 one by one using the pickup roller 212. At this time, the first carriage 226 and the second carriage 227 are arranged at the predetermined reading position P located below a reading window 230.

When a document passes above the reading window 230 provided in a conveyance path from the platen 213 to the discharge tray 215 during conveyance by the document feeder unit 21, the light source 222 irradiates light to the document and reflected light of one main scanning line is successively reflected by the first mirror 223, the second mirror 224 and the third mirror 225 to be incident on the imaging lens 228. The light incident on the imaging lens 228 is imaged on the light receiving surface of the CCD 229. Subsequently, the document is conveyed by the document feeder unit 21 to have the next line read.

The document feeder unit 21 further includes a document reversing mechanism with a switch guide 216, reverse rollers 217 and a reverse conveyance path 218. This document reversing mechanism turns a document having one side thereof read by the first ADF reading upside down and conveys the document to the reading window 230 again, whereby the other side is read again by the CCD 229.

This document reversing mechanism operates only during double-sided reading, but does not operate during single-sided reading. The switch guide 216 is switched to an upper side during single-sided reading and after the reading of the other side during double-sided reading, and the document having gone through the platen 213 is discharged onto the discharge tray 215 by the discharge roller 214.

The switch guide 216 is switched to a lower side after the reading of one side during double-sided reading and the document having gone through the platen 213 is conveyed to the reverse conveyance path 218 by the reverse rollers 217. Thereafter, the switch guide 216 is switched to the upper side and the reverse rollers 217 rotate in reverse directions to feed the document to the platen 213 again. Hereinafter, the mode for reading both sides of a document using the document reversing mechanism is referred to as a double-sided reverse reading mode.

Further, the image reader 2 can read one side of a document by the CCD 229 during the conveyance of the document in the ADF reading mode and, substantially simultaneously, read the other side of the document by the CIS 231. In this case, the document conveyed from the document tray 211 by the document feeder unit 21 has the one side read by the CCD 229 when passing above the reading window 230 and further has the other side read when passing an arrangement position of the CIS 231. Note that three color LEDs of RGB or the like are used as a light source in the CIS 231.

By using the CCD 229 and the CIS 231 in this way, the both sides of the document can be read by one document conveyance (one path) from the document tray 211 to the discharge tray 215 by the document feeder unit 21. A mode for reading both sides of a document using the CCD 229 and the CIS 231 in this way is referred to as a double-sided simultaneous reading mode below.

The above double-sided reverse reading mode and the double-sided simultaneous reading mode are provided as reading modes when both sides of a document are read using the ADF reading mode. The double-sided reverse reading mode is used when it is desired to align image qualities of printed images of both sides and the double-sided simultaneous reading mode is used when it is desired to prioritize the shortening of a reading time even if there is a difference in the image qualities of the printed images of the both sides.

Note that the complex machine 1a in this embodiment is initially set at the double-sided simultaneous reading mode and a document image reading operation is performed in the double-sided simultaneous reading mode if an image forming instruction is entered without setting a particular reading mode.

The apparatus main body 3 includes a plurality of sheet cassettes 461, feed rollers 462 for feeding recording sheets one by one from the sheet cassettes 461 and conveying them to an image forming unit 40, and the image forming unit 40 for forming an image on a recording sheet conveyed from the sheet cassette 461. Further, the apparatus main body 3 includes a sheet tray 471 and a feed roller 472 for feeding recording sheets placed on the sheet tray 471 one by one to the image forming unit 40.

The image forming unit 40 includes a charge remover 421 for removing residual electric charges from a surface of a photoconductive drum 43, a charger 422 for charging the surface of the photoconductive drum 43 having the electric charges removed therefrom, an exposure device 423 for exposing the surface of the photoconductive drum 43 by outputting a laser beam based on image data obtained by the scanner unit 22 and forming an electrostatic latent image on the surface of the photoconductive drum 43, developing devices 44C, 44M, 44Y and 44K for forming toner images of respective colors of cyan (C), magenta (M), yellow (Y) and black (K) on the photoconductive drum 43 based on the electrostatic latent image, a transfer drum 49 for transferring the toner image of the respective colors formed on the photoconductive drum 43 in a superimposition manner, a transfer device 41 for transferring a toner image on the transfer drum 49 to a recording sheet as a recording medium according to the present invention, a fixing device 45 for heating the recording sheet having the toner image transferred thereto at a preset fixing temperature and fixing the toner image to the recording sheet, and conveyor rollers 463, 464 for conveying the recording sheet having passed through the image forming unit 40 to the stack tray 6 or the discharge tray 48.

The fixing device 45 includes a fixing roller 451, a pressure roller 452 and a temperature sensor 453.

The fixing roller 451 is internally provided with an unillustrated heater, which is, for example, a halogen heater, and heated from the inside by this heater. Power is supplied to this heater from an alternating-current power supply under the control of a control unit 61 (FIG. 3) to be described later and a heating degree of the fixing roller 451 is adjusted according to the amount of the supplied power.

The pressure roller 452 is pressed toward the fixing roller 451 by an unillustrated driving mechanism, whereby a strip-like nip portion is formed along rotating shafts of the fixing roller 451 and the pressure roller 452 between the fixing roller 451 and the pressure roller 452. Then, the recording sheet passes through the nip portion, whereby the recording sheet is heated and pressed and the toner image is fixed (thermally fixed) to the recording sheet.

Figure 3:
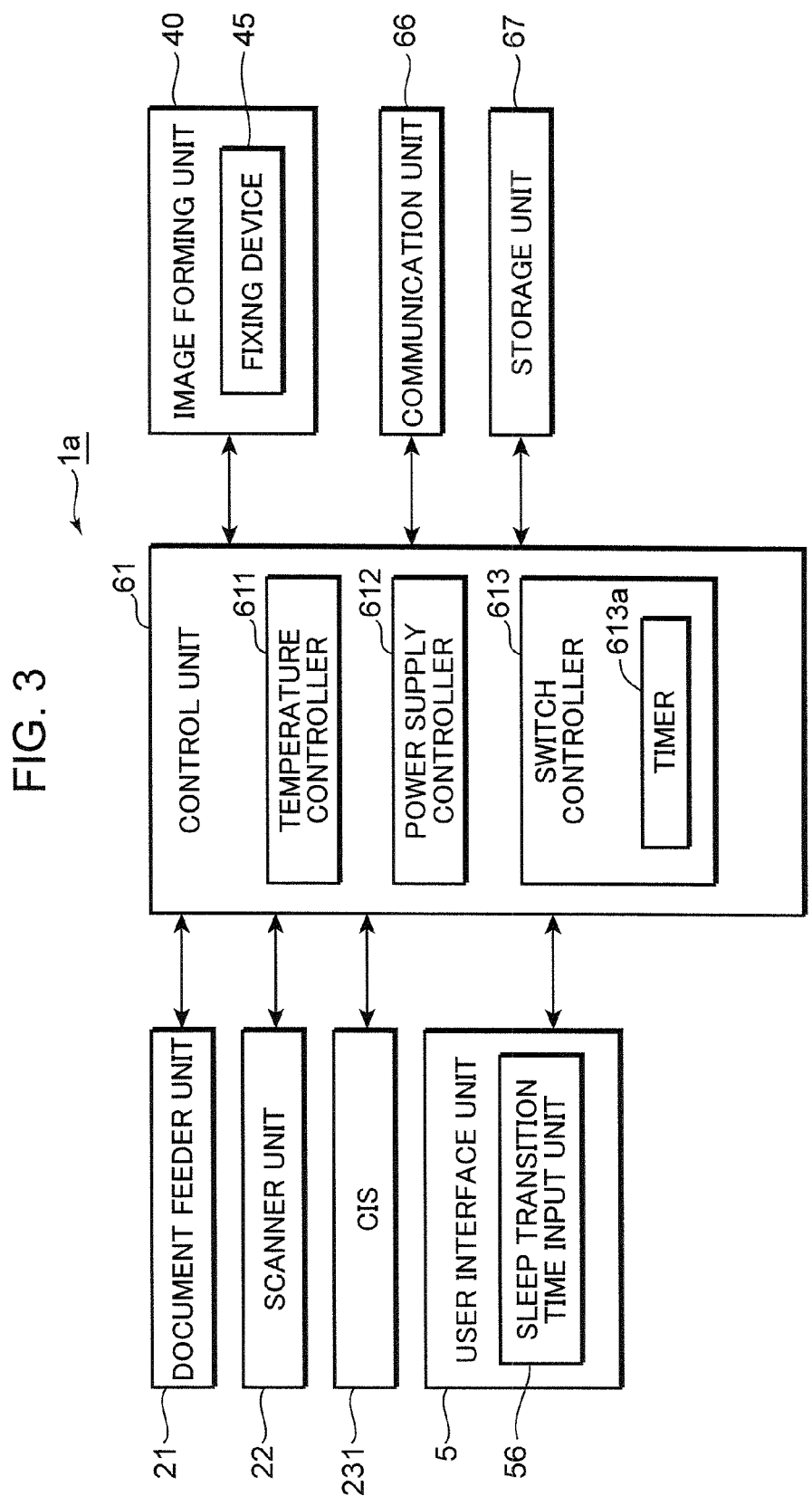
FIG. 3 is a block diagram showing the electrical construction of the complex machine according to the first embodiment.

The temperature sensor 453 measures the temperature (fixing temperature) of the fixing roller 451 and outputs the measured fixing temperature to the control unit 61 (see FIG. 3).

Note that, in the case of forming an image on both sides of a recording sheet, this recording sheet is nipped by the conveyor rollers 463 at a side of the discharge tray 48 after an image is formed on one side of the recording sheet in the image forming unit 40. In this state, the conveyor rollers 463 are rotated in reverse directions to switch back the recording sheet, the recording sheet is conveyed to a side upstream of the image forming unit 40 along a sheet conveyance path L again and is discharged to the stack tray 6 or the discharge gray 48 after an image is formed on the other side in the image forming unit 40.

A display 51 which enables a user to view operation screens, various messages and the like and a user interface unit 5 including operation buttons used to enter various operation commands are provided at the front side of the apparatus main body 3.

Figure 2:
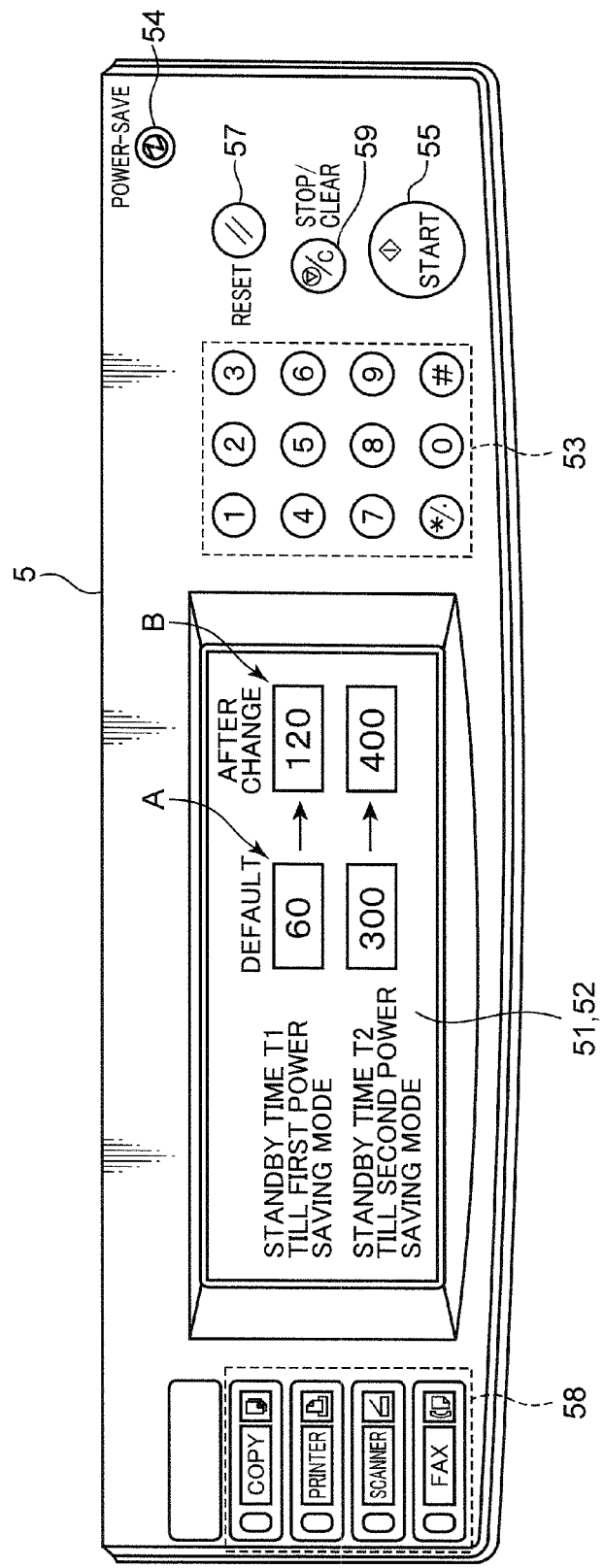
FIG. 2 is a front view of a user interface unit provided in the complex machine according to the first embodiment.

As shown in FIG. 2, the user interface unit 5 includes the display 51, a touch panel 52, a numerical pad 53, various operation buttons 54 to 57, function selection buttons 58 and the like.

The display 51 is an LCD (Liquid Crystal Display), an ELD (Electronic Luminescent Display) or the like and operation guidance screens for the user on sheet size selection, magnification selection, density selection and the like are displayed thereon. This display 51 is integrally formed to the touch panel 52. The touch panel 52 detects a touched position when being touched by the user and outputs a detection signal indicating this touched position to the control unit 61 (see FIG. 3) to be described later.

The numerical pad 53 is used, for example, to enter the number of copies to be made when the copy function of the complex machine 1*a* is used and enter the telephone number of a destination and the like when the facsimile function is used. A power-save button 54 is a button used to set the complex machine 1*a* in a power saving (low power) mode. A start button 55 is a button used to start a copying operation, a scanning operation and the like and a stop/clear button 59 is a button used to stop a copying operation, a scanning operation and the like and cancel an input operation. A reset button 57 is a button used to set the display of the display 51 and various settings to initial states or standard operating states. The function selection buttons 58 are buttons for setting the copy function, the printer function, the scanner function and the facsimile function.

FIG. 3 is a block diagram showing the electrical construction of the complex machine 1*a*. Note that parts identical to the respective parts shown in FIGS. 1 and 2 are denoted by the same reference numerals and not described. The complex machine 1*a* includes the document feeder unit 21, the scanner unit 22, the CIS 231, the user interface unit 5, the image forming unit 40, a communication unit 66, a storage unit 67 and the control unit 61.

The document feeder unit 21 automatically picks up a document placed on the document tray 211 and conveys it so as to enable document reading by the CCD 229 and the CIS 231 when the document is copied or scanned in the above ADF reading mode. The scanner unit 22 and the CIS 231 correspond to the scanner unit 22 and the CIS 231 shown in FIGS. 1 and 2.

The user interface unit 5 corresponds to the user interface unit 5 shown in FIG. 1, is used by a user for operations relating to the copy function, the printer function, the facsimile function, the scanner function and the like and gives operation instructions (commands) and the like by the user to the control unit 61.

The image forming unit 40 forms an image on a recording sheet based on image data obtained by the scanner unit 22 and the CIS 231 or image data transferred from a personal computer, a facsimile machine or the like via the communication unit 66.

The communication unit 66 transmits and receives various data to and from external apparatuses such as computers connected via a network using an unillustrated network interface and facsimile machines.

The storage unit 67 includes a storage for storing image data obtained by reading operations of the scanner unit 22 and the CIS 231, image data processed by the control unit 61 and the like, a storage for storing the names and facsimile numbers of shortening buttons at the time of facsimile transmission, the IP addresses of transmission destinations at the time of use as a network scanner and the like beforehand, and a storage for storing an operation control program for the respective parts.

The control unit 61 is responsible for the entire operation control of the complex machine 1*a* and includes a CPU, a RAM, a ROM and the like.

The control unit 61 performs a process based on the operation control program stored in an unillustrated ROM or the storage unit 67 in accordance with various instruction signals and the like input to the user interface unit 5 from the user and controls the complex machine 1*a* in a comprehensive manner through the output of instruction signals to the respective functional units (document feeder unit 21, scanner unit 22, CIS 231, user interface unit 5, image forming unit 40 and communication unit 66), data transfer and the like. That is, an example of a manipulation instruction receiver for receiving an instruction for a manipulation on the complex machine 1*a* is constructed by the user interface unit 5 and the control unit 61.

Further, the user interface unit 5 includes a sleep transition time input unit 56, and the control unit 61 has functions as a temperature controller 611, a power supply controller 612 and a switch controller 613.

The temperature controller 611 on/off controls a switch provided in a feeder line connected to the heater inside the fixing roller 451 according to the fixing temperature of the fixing roller 451 output from the temperature sensor 453 provided in the fixing device 45, thereby adjusting the amount of power supplied to the heater and controlling the fixing temperature of the fixing roller 451.

The power supply controller 612 switches a power supply mode of the complex machine 1*a* and the switch controller 613 instructs the switch of the power supply mode to the power supply controller 612.

The complex machine 1*a* has, as power supply modes, a normal power mode for supplying power to the respective parts including the image forming unit 40, a first power saving mode for reducing a power supply amount as compared with the normal power mode by setting the temperature of the fixing roller 451 to a temperature (e.g. 100° C.) lower than a preset fixing temperature (e.g. 180 to 200° C.) and a second power saving mode for reducing the power supply amount as compared with the first power saving mode by setting the temperature of the fixing roller 451 to a temperature (e.g. 50 to 80° C.) even lower than that in the first power saving mode, for example, through the stop of heating of the fixing roller 451.

The power supply controller 612 adjusts the amount of alternating-current power supplied from an alternating-current power supply and direct-current power generated by converting the alternating-current power to a preset supply amount corresponding to the power supply mode instructed from the switch controller 613 by controlling unillustrated AC/DC converter and DC/DC converter. In this way, the complex machine 1*a* is set in (transitions to) the instructed power supply mode.

The switch controller 613 includes a timer 613*a* for measuring an elapsed time from a point of time when the execution of the operation of the complex machine 1*a* based on a manipulation performed on the complex machine 1*a* is completed in a state where the complex machine 1*a* is set in the normal power mode. For example, when the power-save button 54 (see FIG. 2) provided on the user interface unit 5 is pressed or when the time measured by the timer 613*a* reaches a standby time to be described later without any instruction for a manipulation on the complex machine 1*a* being received by the user interface unit 5 and the control unit 61, the switch controller 613 outputs an instruction to switch the power supply mode from the normal power mode to the first power saving mode or from the first power saving mode to the second power saving mode to the power supply controller 612.

Further, the switch controller 613 outputs an instruction to switch the power supply mode from the first or the second power saving mode to the normal power mode to the power supply controller 612 when an instruction for a manipulation on the complex machine 1*a* is received by the user interface unit 5 and the control unit 61 in a state where the complex machine 1*a* is set in the first or the second power saving mode.

The sleep transition time input unit 56 is used to make an entry to set a standby time so that an instruction to switch from the normal power mode to the first power saving mode or from the first power saving mode to the second power saving mode is output to the power supply controller 612 by the switch controller 613 at a timing corresponding to a time (standby time) elapsed without any instruction for a manipulation on the complex machine 1a being received.

The sleep transition time input unit 56 is composed of the display 51, the touch panel 52 and the numerical pad 53. For example, the control unit 61 causes the display 51 to display a setting screen for standby times T1, T2 as the sleep transition time input unit 56 so that the power supply mode is switched from the normal power mode to the first power saving mode by the switch controller 613 when the standby time T1 (e.g. 60 sec) elapses without any instruction for a manipulation on the complex machine 1a being received and the power supply mode is switched from the first power saving mode to the second power saving mode by the switch controller 613 when the standby time T2 (e.g. 300 sec) elapses without any instruction for a manipulation on the complex machine 1a being received as shown in FIG. 2.

Default values (arrow A) and standby times after a change (arrow B) for the standby times T1, T2 are displayed on the setting screen for the standby times T1, T2. By entering desired standby times T1, T2 in numerical values using the numerical pad 53 in a state where a display area indicated by the arrow B is touched to display an unillustrated cursor in this display area, the standby times T1, T2 are changed to the entered times.

Note that the default values (arrow A) for the standby times T1, T2 are stored in the ROM or the like provided in the storage unit 67 or the control unit 61 beforehand at the time of product shipment and the standby times T1, T2 changed on this setting screen are stored in the RAM or the like provided in the storage unit 67 or the control unit 61 by the control unit 61.

The switch controller 613 outputs a power supply mode switch instruction to the power supply controller 612 based on the default values of the standby times when the standby times T1, T2 are not changed while outputting the power supply mode switch instruction to the power supply controller 612 based on the standby times T1, T2 after a change when the standby times T1, T2 are changed.

The switch controller 613 instructs a switch from the normal power mode to the second power saving mode instead of a switch from the normal power mode to the first power saving mode to the power supply controller 612 if a manipulation performed on the complex machine 1a to instruct the power supply controller 612 to switch from the first and second power saving modes to the normal power mode has not been the one for causing the image forming unit 40 to form an image a preset number of times or more in a row.

More specifically, if the user uses, for example, the facsimile function ten times in a row in a state where the complex machine 1a is set in the first power saving mode or the second power saving mode, the switch controller 613 judges that the manipulation performed on the complex machine 1a to instruct the power supply controller 612 to switch from the first and second power saving modes to the normal power mode has not been the one for causing the image forming unit 40 to form an image ten times, which is the preset number of times, or more in a row.

Figure 4:
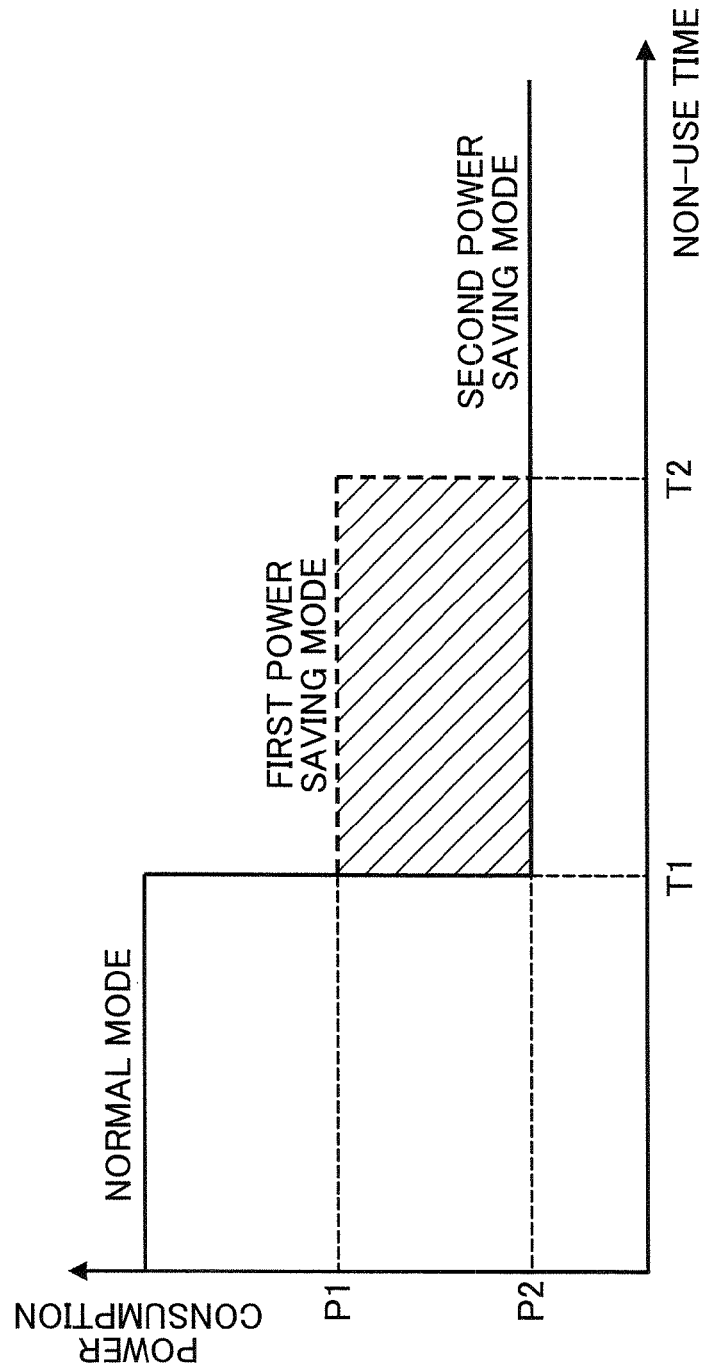
FIG. 4 is a diagram showing a change in power consumption in respective power supply modes in the first embodiment.

Upon making the above judgment, the switch controller 613 instructs the switch from the normal power mode to the second power saving mode (solid line in FIG. 4) instead of the switch from the normal power mode to the first power saving mode (dotted line in FIG. 4) to the power supply controller 612 as shown in FIG. 4.

Note that the preset number of times is stored in the ROM or the like provided in the storage unit 67 or the control unit 61 beforehand at the time of product shipment. Without being limited to this, a setting screen for the preset number of times may be displayed on the display 51 by the user interface unit 5 and the control unit 61 similar to the above standby times T1, T2 and the number of times entered on this setting screen may be stored in the RAM or the like provided in the storage unit 67 or the control unit 61.

That is, according to this construction, if the manipulation performed on the complex machine 1a to instruct the power supply controller 612 to switch from the first and second power supply modes to the normal power mode has not been the one for causing the image forming unit 40 to form an image the preset number of times or more in a row, the power supply amount corresponding to the area of a hatched rectangular area in FIG. 4 which is a product of a difference value between power consumption P1 in the first power saving mode and power consumption P2 in the second power saving mode and a difference value between the standby times T2 and T2 is reduced. That is, power supplied to the respective parts of the complex machine 1a can be appropriately reduced according to the used state of an image forming operation by the image forming unit 40 in the complex machine 1a.

Note that the above preset standby times and number of times are not limited to the above examples and may be set for each preset time period of day, for example, by setting the standby times T1, T2 and the number of times at small values so that the switch to the first and second power saving modes is instructed with high frequency in late night and early-morning hours during which image formation by the image forming unit 40 is thought to be less frequently performed and by setting the standby times T1, T2 and the number of times at large values so that the switch to the first and second power saving modes is not instructed with high frequency in midday hours during which image formation by the image forming unit is thought to be more frequently performed. In this case, the power supply amount can be flexibly reduced according to the used state of the complex machine 1a in each time period of day.

Operations in a power supply mode switch control are described below with reference to FIGS. 5 and 6.

Figure 5:
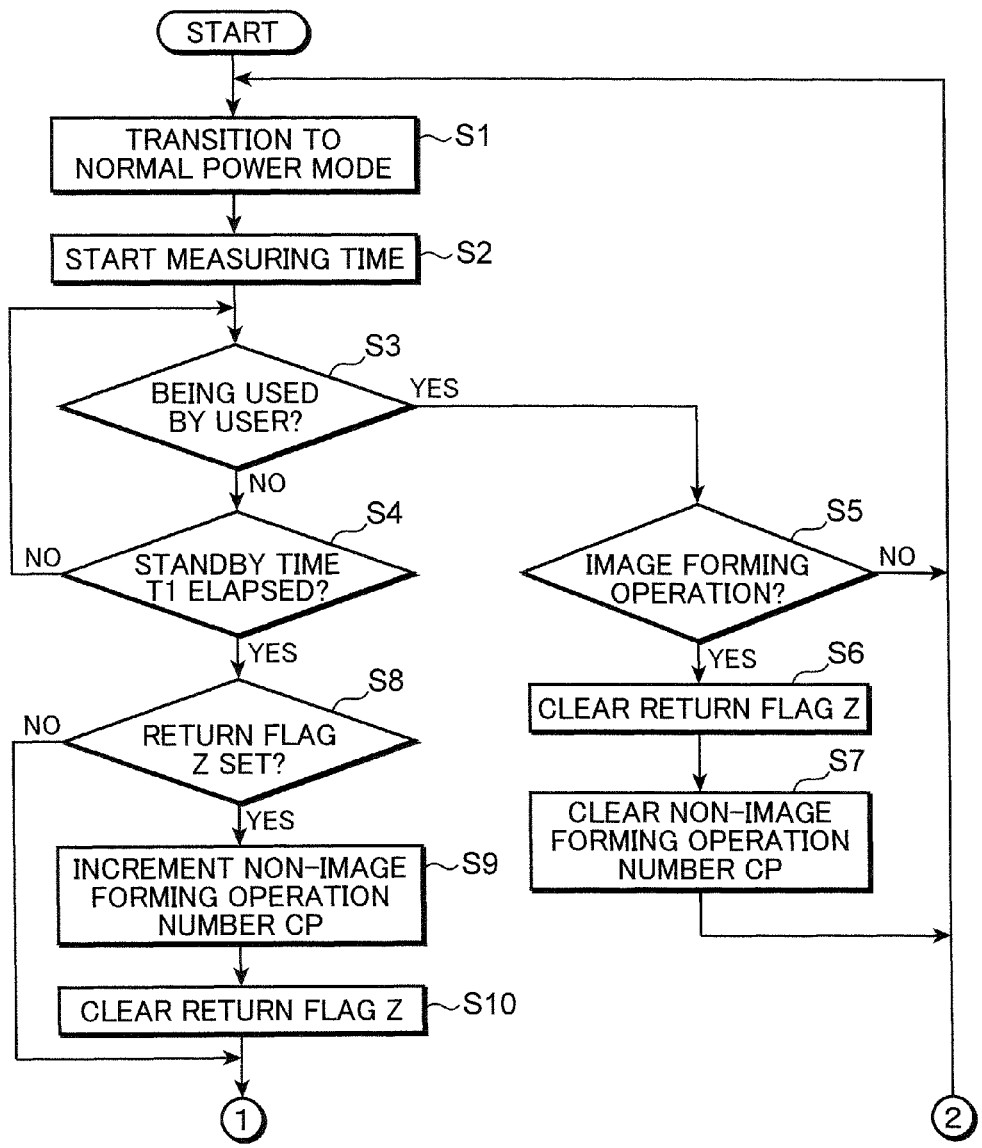
FIG. 5 is a flow chart showing the first half of a power supply mode switch control according to the first embodiment.

As shown in FIG. 5, when the complex machine 1a is turned on, the switch controller 613 outputs an instruction to switch to the normal power mode to the power supply controller 612 and the power supply controller 612 sets the power supply mode to the normal power mode in accordance with this instruction (S1).

When an operation of the complex machine 1a based on a manipulation performed on the complex machine 1a is completed in a state where the complex machine 1a is set in the normal power mode by Step S1, the timer 613a starts measuring time (S2, time measuring step).

For example, if a manipulation relating to an image forming operation is received via the user interface unit 5 and the control unit 61, the timer 613a starts measuring time when the image forming operation received by this manipulation is completed and a recording sheet is discharged to the stack tray 6 or the discharge tray 48.

If an instruction for a manipulation on the complex machine 1a is received via the user interface unit 5 and the control unit 61 (S3; YES) before the time measured by the timer 613a reaches the standby time T1 (S4; YES), the switch controller 613 judges whether or not this manipulation is the one relating to the image forming operation by the image forming unit 40 (S5).

The switch controller 613 clears a return flag Z and a non-image forming operation number CP (S6, S7) and performs the processing of Step S1 if the manipulation is judged to be the one relating to the image forming operation by the image forming unit 40 (S5; YES). On the other hand, the switch controller 613 performs the processing of Step S1 if the manipulation is judged not to be the one relating to the image forming operation by the image forming unit 40 (S5; NO).

Here, the return flag Z indicates that the power supply mode is switched from the first or second power saving mode to the normal power mode and the complex machine 1a has returned to the normal power mode. Further, the non-image forming operation number CP indicates the number of successive returns of the complex machine 1a to the normal power mode because of a manipulation relating to an operation which is not the image forming operation by the image forming unit 40.

Note that the above return flag Z and non-image forming operation number CP are read and written via the RAM in the above respective Steps. Further, a method for clearing the return flag Z and the non-image forming operation number CP by the switch controller 613 in Steps S6, S7 is not particularly limited to a specific method and may be an appropriate design matter which is, for example, deletion of the return flag Z and non-image forming operation number CP written in the RAM or storage of fixed values (e.g. 0) indicating the clearing of the return flag Z and non-image forming operation number CP in a preset address area of the RAM for storing the return flag Z and non-image forming operation number CP by the switch controller 613.

On the other hand, the switch controller 613 judges whether or not the return flag Z is set (S8) if the time measured by the timer 613a reaches the standby time T1 (S4; YES) without any instruction for a manipulation on the complex machine 1a being received via the user interface unit 5 and the control unit 61 (S3; NO).

Note that the return flag Z is set, for example, by storing a preset value indicating the return flag Z in the RAM or storing a fixed value (e.g. 1) indicating the setting of the return flag Z in a preset address area of the RAM for storing the return flag Z by the switch controller 613 as described later.

If the return flag Z is judged to be set (S8; YES), the switch controller 613 increments the non-image forming operation number CP by one (S9) and clears the return flag Z (S10), judging that the power supply mode has been switched from the first or second power saving mode to the normal power mode due to a manipulation relating to an operation other than the image forming operation by the image forming unit 40.

Figure 6:
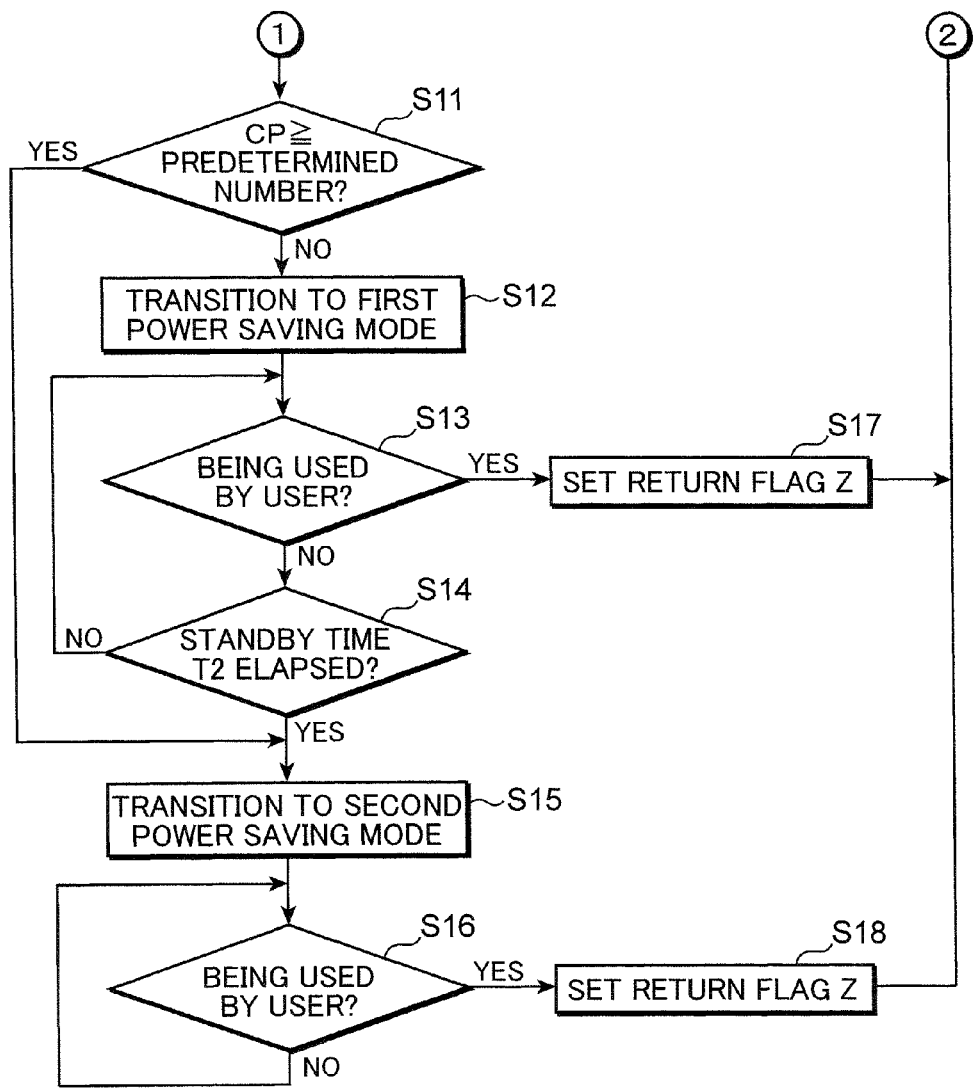
FIG. 6 is a flow chart showing the second half of the power supply mode switch control according to the first embodiment.

Subsequently, as shown in FIG. 6, the switch controller 613 judges whether or not the non-image forming operation number CP is equal to or larger than the preset number of times. If the non-image forming operation number CP is judged to be below the preset number of times (S11; NO), the switch controller 613 outputs an instruction to switch from the normal power mode to the first power saving mode to the power supply controller 612, judging a high possibility of returning to the normal power mode by performing the image forming operation by the image forming unit 40 in a state where the complex machine 1a is set in the first or second power saving mode, and the power supply controller 612 switches the power supply mode to the first power saving mode in accordance with this instruction (S12).

That is, when judging a situation with a high possibility of returning to the normal power mode by performing the image forming operation by the image forming unit 40 in the state where the complex machine 1a is set in the first or second power saving mode, the switch controller 613 outputs an instruction to switch to the first power saving mode for reducing the power supply amount as compared with the normal power mode by setting the fixing temperature in the image forming unit 40 to a temperature lower than the preset fixing temperature so that the image forming operation is quickly performed by the image forming unit 40 when the complex machine 1a returns to the normal power mode.

On the other hand, the switch controller 613 judges whether or not the non-image forming operation number CP is equal to or larger than the preset number of times. If the non-image forming operation number CP is judged to be equal to or larger than the preset number of times (S11; YES), the switch controller 613 outputs an instruction to switch from the normal power mode to the second power saving mode to the power supply controller 612, judging a high possibility of returning to the normal power mode by performing an operation other than the image forming operation by the image forming unit 40 in the state where the complex machine 1a is set in the first or second power saving mode, and the power supply controller 612 switches the power supply mode to the second power saving mode in accordance with this instruction (S15).

That is, when judging a situation with a high possibility of returning to the normal power mode by performing an operation other than the image forming operation by the image forming unit 40 in the state where the complex machine 1a is set in the first or second power saving mode, the switch controller 613 outputs an instruction to switch to the second power saving mode capable of reducing the power supply amount even more than in the first power saving mode, for example, by stopping the supply of power to the heater provided inside the fixing roller 451 to stop heating in the image forming unit 40 since the need for keeping the fixing temperature in the image forming unit 40 at a temperature lower than the preset fixing temperature so that the image forming operation by the image forming unit 40 is quickly performed when the complex machine 1a returns to the normal power mode is thought to be low.

Referring back to FIG. 6, the switch controller 613 sets the return flag Z to indicate the return of the complex machine 1a to the normal power mode (S17) and returns to the processing of Step S1 (FIG. 5) if an instruction for a manipulation on the complex machine 1a is received via the user interface unit 5 and the control unit 61 (S13; YES) before the time measured by the timer 613a reaches the standby time T2 (S14; YES).

Further, the switch controller 613 outputs an instruction to switch from the first power saving mode to the second power saving mode to the power supply controller 612 and the power supply controller 612 switches the power supply mode to the second power saving mode in accordance with this instruction (S15) if the time measured by the timer 613a reaches the standby time T2 (S14; YES) without any instruction for a manipulation on the complex machine 1a being received via the user interface unit 5 and the control unit 61 (S13; NO).

In this way, the switch controller 613 keeps the complex machine 1a in the second power saving mode (S16; NO) until an instruction for a manipulation on the complex machine 1a is received via the user interface unit 5 and the control unit 61. On the other hand, the switch controller 613 sets the return flag Z to indicate the return of the complex machine 1a to the normal power mode (S18) and returns to the processing of Step S1 (FIG. 5) if an instruction for a manipulation on the complex machine 1a is received via the user interface unit 5 and the control unit 61 (S16; YES) with the complex machine 1a set in the second power saving mode.

Note that a method for setting the return flag Z by the switch controller 613 in Steps S17 and S18 is not particularly limited to a specific method and may be an appropriate design matter which is, for example, storage of a value (e.g. Z) indicating the return flag Z in the RAM or storage of a fixed value (e.g. 1) indicating the setting of the return flag Z in a preset address area of the RAM for storing the return flag Z by the switch controller 613.

Specifically, an example of a switch control step according to the present invention is composed of processings of Steps S1, S3 to S18.

As described above, according to the first embodiment, it is judged that a manipulation performed on the complex machine 1a to cause the switch controller 613 (switch control step) to instruct a switch from the first and second power saving modes to the normal power mode has not been the one for causing the image forming unit 40 to form an image the preset number of times or more in a row, i.e. a situation where a toner image is predicted to be heated and fixed to a recording sheet by the image forming unit 40 with less frequency is judged.

In this situation, a control is so executed by the switch controller 613 (switch control step) as to switch from the normal power mode to the second power saving mode for reducing the power supply amount by setting the fixing temperature in the image forming unit 40 to the temperature even lower than that in the first power saving mode instead of switching from the normal power mode to the first power saving mode. That is, power supplied to the respective parts of the complex machine 1a can be appropriately reduced according to the used state of the image forming operation by the image forming unit 40 in the complex machine 1a.

Further, the complex machine 1a according to the first embodiment includes the image reader 2 for reading a document, and the manipulation, which is not the one for causing the image forming unit 40 to form an image, is the one for causing the image reader 2 to read a document but not causing the image forming unit 40 to form an image.

If a manipulation is performed to cause the image forming unit 40 to form an image, an image forming mode (e.g. copy mode or printer mode) is performed. In this mode, the fixing device 45 is used. On the other hand, if a manipulation is performed to cause the image reader 2 to read a document and not to cause the image forming unit 40 to form an image, a document reading mode (e.g. facsimile transmission mode or scanner mode) is performed. In this mode, the fixing device 45 is not used.

Since the temperature of the fixing device 45 is set at a relatively low temperature (e.g. room temperature or 50 to 80° C.) in the second power saving mode, it takes a relatively long time before the temperature of the fixing device 45 reaches the fixing temperature (e.g. 180 to 200° C.). This waiting time has a duration which causes a user to feel stress. Accordingly, the first power saving mode in which the fixing temperature of the fixing device 45 is set to be relatively high is provided as a preliminary power saving mode for the second power saving mode to reduce stress given to the user due to the waiting time in the power saving mode.

Since the fixing device 45 is not used in the document reading mode, a time required from the second power saving mode to the execution of the document reading mode is relatively short. This waiting time is a duration which causes the user to feel no stress or only slight stress. Thus, the user using the document reading mode is less subject to omission of the first power saving mode.

If a manipulation performed on the complex machine 1a has not been the one for causing the image forming unit 40 to form an image the preset number of times or more in a row after the switch from the first or second power saving mode to the normal power mode, a possibility of performing the image forming mode is regarded to be low and a possibility of performing the document reading mode is regarded to be high thereafter. Thus, even if the switch is made from the normal power mode to the second power saving mode, there is a low possibility of giving stress to the user due to the waiting time. Accordingly, in the first embodiment, if the manipulation has not been the one for causing the image forming unit 40 to form an image the above preset number of times or more in a row, the power supply mode is switched from the normal power mode to the second power saving mode without being switched to the first power saving mode. In this way, power consumption of the complex machine 1a can be reduced.

A modification of the first embodiment is described. This modification is also applicable to a second embodiment. In the first embodiment, the switch controller 613 instructs the switch from the second power saving mode to the normal power mode to the power supply controller 612 when an instruction for a manipulation on the complex machine 1a is received via the user interface unit 5 and the control unit 61 in the state where the complex machine 1a is set in the second power saving mode. Thus, even if the complex machine 1a is operated by mistake such as when a person collides with the complex machine 1a to perform a certain manipulation upon passing near the complex machine 1a in the state where the complex machine 1a is set in the second power saving mode, the complex machine 1a is switched to the normal power mode and power is supplied to the respective parts in the normal power mode until the standby time elapses.

Accordingly, without being limited to the construction of the above embodiment, the switch controller 613 may instruct a switch from the second power saving mode to the first power saving mode instead of the switch from the second power saving mode to the normal power mode to the power supply controller 612 when an instruction for a manipulation on the complex machine 1a is received by the user interface unit 5 and the control unit 61 in the state where the complex machine 1a is set in the second power saving mode. In accordance with this, the timer 613a starts measuring time when the complex machine 1a is set in the first power saving mode by the instruction from the switch controller 613. Further, in the state where the complex machine 1a is set in the first power saving mode by this instruction, the switch controller 613 may instruct a switch to the second power saving mode to the power supply controller 612 when the time measured by the timer 613a reaches a preset standby time (e.g. time equivalent to T2-T1 in FIG. 4) without any instruction for a manipulation on the complex machine 1a being received via the user interface unit 5 and the control unit 61, and may instruct a switch to the normal power mode to the power supply controller 612 when an instruction for a manipulation on the complex machine 1a is received via the user interface unit 5 and the control unit 61.

According to this modification, even if the complex machine 1a is operated by mistake in the state where the complex machine 1a is set in the second power saving mode, the complex machine 1a is switched to the first power saving mode and power is supplied to the respective parts in the first power saving mode until the standby time elapses. Thus, the power supply amount can be reduced as compared with the case where a switch is made to the normal power mode as described above when the complex machine 1a is operated by mistake.

Second Embodiment

Figure 7:
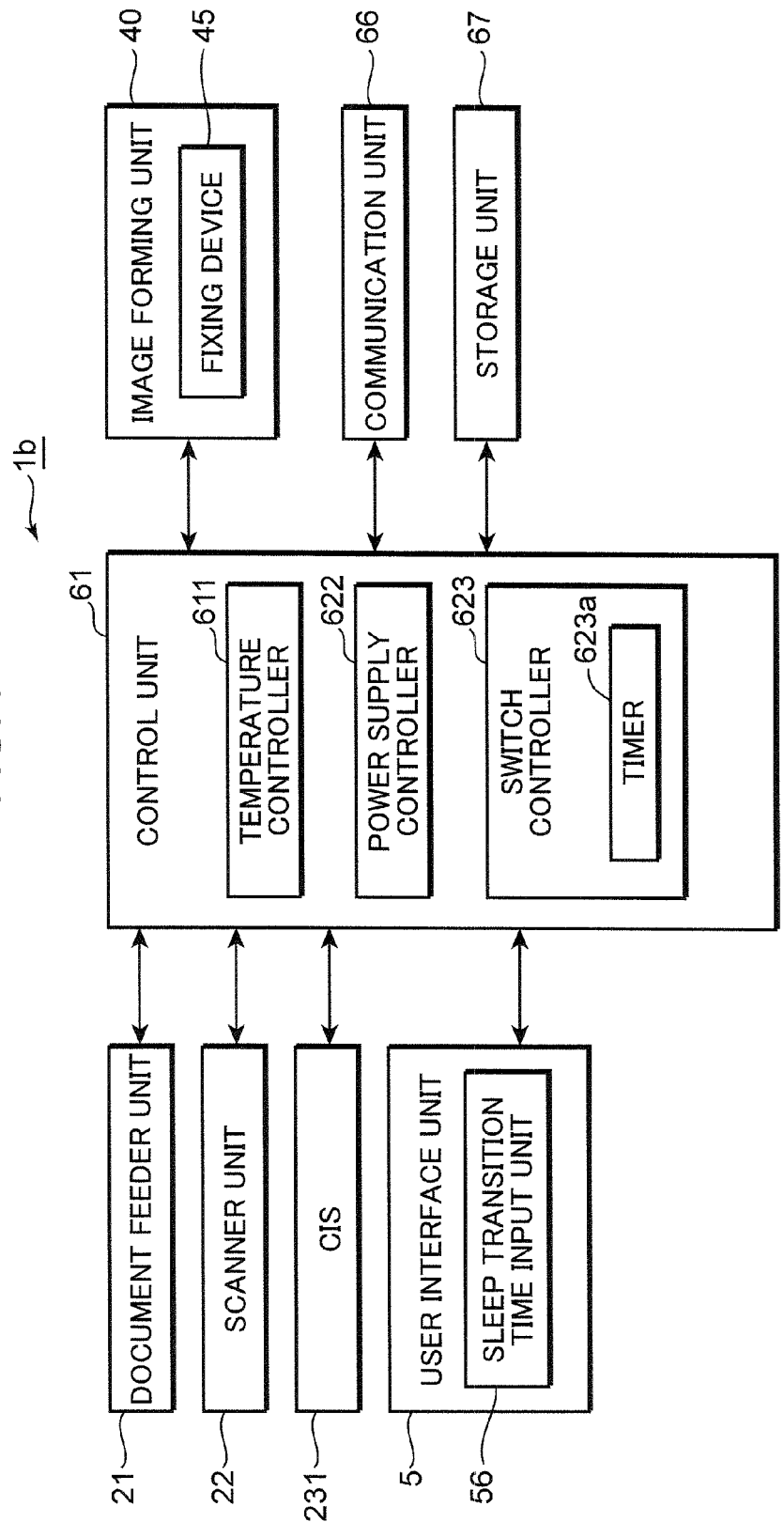
FIG. 7 is a block diagram showing the electrical construction of a complex machine according to a second embodiment.

A second embodiment of the electrical apparatus and the power supply control method according to the present invention is described, taking an image forming apparatus as an example. A complex machine including a color copy function, a scanner function, a facsimile function, a printer function and other functions is illustrated as this image forming apparatus. FIG. 7 is a block diagram showing the electrical construction of a complex machine 1b according to the second embodiment. A sectional view of the complex machine 1b according to the second embodiment is the same as that of the complex machine 1a according to the first embodiment shown in FIG. 1, and a plan view of a user interface unit 5 of the complex machine 1b according to the second embodiment is the same as that of the user interface unit 5 according to the first embodiment shown in FIG. 2. Thus, the complex machine 1b and the user interface unit 5 are not described with reference to the sectional view and the plan view.

In the complex machine 1b according to the second embodiment shown in FIG. 7, blocks other than a power supply controller 622 and a switch controller 623 are the same as those of the complex machine 1a according to the first embodiment shown in FIG. 3 other than the power supply controller 612 and the switch controller 613. Thus, these blocks are denoted by the same reference numerals and not described.

The power supply controller 622 is for switching a power supply mode of the complex machine 1b, and the switch controller 623 is for instructing a switch of the power supply mode to the power supply controller 622.

The complex machine 1b has, as power supply modes, a normal power mode for supplying power to the respective parts including an image forming unit 40, a first power saving mode for reducing a power supply amount as compared with the normal power mode such as by setting the temperature of a fixing roller 451 to a temperature (e.g. 100° C.) lower than a preset fixing temperature (e.g. 180 to 200° C.), a second power saving mode for reducing the power supply amount as compared with the first power saving mode by setting the temperature of the fixing roller 451 to a temperature (e.g. 50 to 80° C.) even lower than that in the first power saving mode, for example, through the stop of heating of the fixing roller 451, and a third power saving mode in which the power supply amount is less than in the first power saving mode, but more than in the second power saving mode.

The power supply controller 622 adjusts the amount of alternating-current power supplied from an alternating-current power supply and direct-current power generated by converting the alternating-current power to a preset supply amount corresponding to the power supply mode instructed from the switch controller 623 by controlling unillustrated AC/DC converter and DC/DC converter. In this way, the complex machine 1b is set in (transitions to) the instructed power supply mode.

The switch controller 623 includes a timer 623a for measuring an elapsed time from a point of time when the execution of the operation of the complex machine 1b based on a manipulation performed on the complex machine 1b is completed in a state where the complex machine 1b is set in the normal power mode. For example, when a power-save button (see FIG. 2) provided on the user interface unit 5 is pressed or when the time measured by the timer 623a reaches a standby time to be described later without any instruction for a manipulation on the complex machine 1b being received by the user interface unit 5 and the control unit 61, the switch controller 623 outputs an instruction to switch the power supply mode from the normal power mode to the first power saving mode or from the first power saving mode to the second power saving mode to the power supply controller 622.

The switch controller 623 outputs an instruction to switch the power supply mode from the first or the second power saving mode to the normal power mode to the power supply controller 622 when an instruction for a manipulation on the complex machine 1b is received by the user interface unit 5 and a control unit 61 in a state where the complex machine 1b is set in the first or the second power saving mode.

A sleep transition time input unit 56 is used to make an entry to set a standby time so that an instruction to switch from the normal power mode to the first power saving mode or from the first power saving mode to the second power saving mode is output to the power supply controller 622 by the switch controller 623 at a timing corresponding to a time (standby time) elapsed without any instruction for a manipulation on the complex machine 1b being received.

The sleep transition time input unit 56 is composed of a display 51, a touch panel 52 and a numerical pad 53. For example, the control unit 61 causes the display 51 to display a setting screen for standby times T1, T2 as the sleep transition time input unit 56 so that the power supply mode is switched from the normal power mode to the first power saving mode by the switch controller 623 when the standby time T1 (e.g. 60 sec) elapses without any instruction for a manipulation on the complex machine 1b being received and the power supply mode is switched from the first power saving mode to the second power saving mode by the switch controller 623 when the standby time T2 (e.g. 300 sec) elapses without any instruction for a manipulation on the complex machine 1b being received as shown in FIG. 2.

Default values (arrow A) and standby times after a change (arrow B) for the standby times T1, T2 are displayed on the setting screen for the standby times T1, T2. By entering desired standby times T1, T2 in numerical values using the numerical pad 53 in a state where a display area indicated by the arrow B is touched to display an unillustrated cursor in this display area, the standby times T1, T2 are changed to the entered times.

Note that the default values (arrow A) for the standby times T1, T2 are stored in a ROM or the like provided in a storage unit 67 or the control unit 61 beforehand at the time of product shipment and the standby times T1, T2 changed on this setting screen are stored in a RAM or the like provided in the storage unit 67 or the control unit 61 by the control unit 61.

The switch controller 623 outputs a power supply mode switch instruction to the power supply controller 622 based on the default values of the standby times when the standby times T1, T2 are not changed while outputting the power supply mode switch instruction to the power supply controller 622 based on the standby times T1, T2 after a change when the standby times T1, T2 are changed.

The switch controller 623 instructs a switch from the normal power mode to the third power saving mode instead of a switch from the normal power mode to the first power saving mode to the power supply controller 622 in the case of satisfying a condition indicating a high probability of instructing a switch from the second power saving mode to the normal power mode when the switch controller 623 instructs a switch to the normal power mode to the power supply controller 622.

That the switch controller 623 has instructed a switch from the second power saving mode to the normal power mode to the power supply controller 622 a preset number of times or more in a row is, for example, set as the above condition indicating a high probability of instructing the switch from the second power saving mode to the normal power mode (this condition is referred to as a "first predetermined condition" below).

Note that the preset number of times is stored in the ROM or the like provided in the storage unit 67 or the control unit 61 beforehand at the time of product shipment. Without being limited to this, a setting screen for the preset number of times may be displayed on the display 51 by the user interface unit 5 and the control unit 61 similar to the above standby times T1, T2 and the number of times entered on this setting screen may be stored in the RAM or the like provided in the storage unit 67 or the control unit 61.

Figure 8:
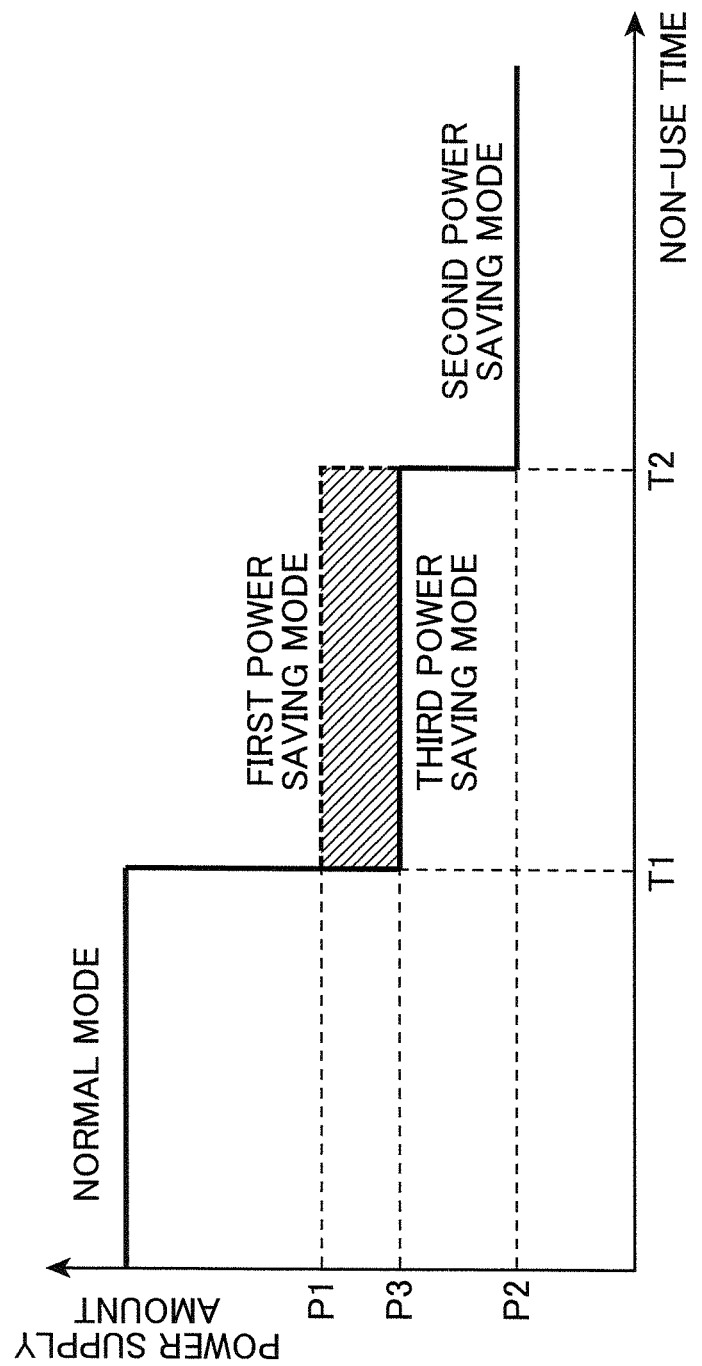
FIG. 8 is a diagram showing a first example of a change in power consumption in respective power supply modes in the second embodiment.

The switch controller 623 instructs a switch from the normal power mode to the third power saving mode (solid line in FIG. 8) instead of a switch from the normal power mode to the first power saving mode (dotted line in FIG. 8) to the power supply controller 622 as shown in FIG. 8, for example, in the case of satisfying the condition indicating a high probability of instructing the switch from the second power saving mode to the normal power mode such as the first predetermined condition.

Here, as shown in FIG. 8, when the switch controller 623 instructs a switch to the third power saving mode because the condition indicating a high probability of instructing the switch from the second power saving mode to the normal power mode is satisfied when the time measured by the timer 623a reaches the preset standby time T1 in the case of instructing a switch from the normal power mode to the first power saving mode without any instruction for a manipulation on the complex machine 1b being received by the user interface unit 5 and the control unit 61, the power supply controller 622 causes power to be supplied to the respective parts of the complex machine 1b at a preset constant supply amount P3 below a power supply amount P1 in the first power saving mode and more than a power supply amount P2 in the second power saving mode during the entire period (period from T1 to T2 in FIG. 8) until the time measured by the timer 623a reaches the preset standby time T2 in the case of instructing a switch from the first power saving mode to the second power saving mode without any instruction for a manipulation on the complex machine 1b being received by the user interface unit 5 and the control unit 61.

That is, the power in the third power saving mode is set to be less than that in the first power saving mode and more than that in the second power saving mode and constant during the entire period of the third power saving mode.

Figure 9:
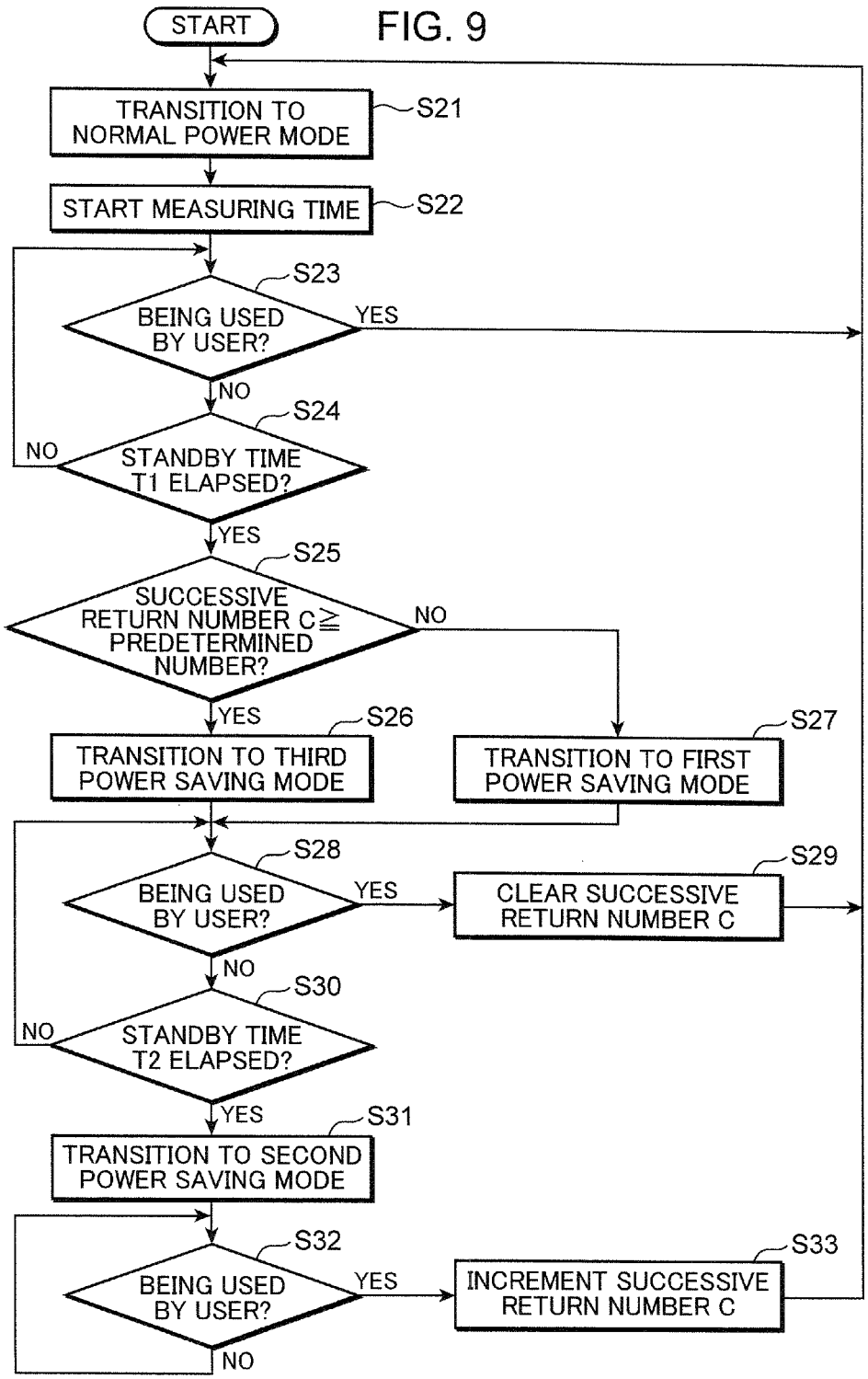
FIG. 9 is a flow chart showing a first example of operations in a power supply mode switch control in the second embodiment.

Operations in a power supply mode switch control are described below with reference to FIG. 9.

When the complex machine 1b is turned on, the switch controller 623 outputs an instruction to switch to the normal power mode to the power supply controller 622 and the power supply controller 622 sets the power supply mode to the normal power mode in accordance with this instruction (S21).

When an operation of the complex machine 1b based on a manipulation performed on the complex machine 1b is completed in a state where the complex machine 1b is set in the normal power mode by Step S21, the timer 623a starts measuring time (S22, time measuring step).

For example, if a manipulation relating to an image forming operation is received via the user interface unit 5 and the control unit 61, the timer 623a starts measuring time when the image forming operation received by this manipulation is completed and a recording sheet is discharged to the stack tray 6 or the discharge tray 48.

If an instruction for a manipulation on the complex machine 1b is received via the user interface unit 5 and the control unit 61 (S23; YES) before the time measured by the timer 623a reaches the standby time T1 (S24; YES), the switch controller 623 performs the processing of Step S21.

On the other hand, the switch controller 623 judges whether or not a successive return number C indicating the number of times at which the complex machine 1b has been successively switched from the second power saving mode to the normal power mode is set at a value equal to or larger than the preset number of times (S25) if the time measured by the timer 623a reaches the standby time 11 (S24; YES) without any instruction for a manipulation on the complex machine 1b being received via the user interface unit 5 and the control unit 61 (S23; NO). Note that the successive return number C is read and written via the RAM in the respective processing Steps shown in FIG. 9.

Here, if the successive return number C is judged to be set at the value equal to or larger than the preset number of times (S25; YES), the switch controller 623 instructs a switch from the normal power mode to the third power saving mode to the power supply controller 622 and the power supply controller 622 supplies power to the respective parts of the complex machine 1b at the preset constant supply amount P3 less than the power supply amount P1 in the first power saving mode and more than the power supply amount P2 in the second power saving mode as shown in FIG. 8 in accordance with this instruction. In this way, the complex machine 1b is set in (transitions to) the third power saving mode (S26).

On the other hand, if the successive return number C is judged not to be set at the value equal to or larger than the preset number of times (S25; NO), the switch controller 623 instructs a switch from the normal power mode to the first power saving mode to the power supply controller 622 (S27).

Subsequently, the switch controller 623 clears the successive return number C (S29) and returns to the processing of Step S1 to cause the complex machine 1b to transition from the first or third power saving mode to the normal power mode if an instruction for a manipulation on the complex machine 1b is received via the user interface unit 5 and the control unit 61 (S28; YES) before the time measured by the timer 623a reaches the standby time T2 (S30; YES).

Note that a method for clearing the successive return number C by the switch controller 623 in Step S29 is not particularly limited to a specific method and may be an appropriate design matter which is, for example, deletion of the successive return number C written in the RAM or storage of a fixed value (e.g. 0) indicating the clearing of the successive return number C in a preset address area of the RAM for storing the successive return number C by the switch controller 623.

On the other hand, if the time measured by the timer 623a reaches the standby time T2 (S30; YES) without any instruction for a manipulation on the complex machine 1b being received by the user interface unit 5 and the control unit 61 (S28; NO), the switch controller 623 outputs an instruction to switch from the first or third power saving mode to the second power saving mode to the power supply controller 622 and the power supply controller 622 switches the power supply mode to the second power saving mode in accordance with this instruction (S31).

In this way, the switch controller 623 keeps the complex machine 1b in the second power saving mode until an instruction for a manipulation on the complex machine 1b is received via the user interface unit 5 and the control unit 61 (S32; NO). On the other hand, if an instruction for a manipulation on the complex machine 1*b* is received via the user interface unit 5 and the control unit 61 (S32; YES) in a state where the complex machine 1*b* is set in the second power saving mode, the switch controller 623 increments the successive return number C by 1 (S33) and returns to the processing of Step S21.

Specifically, an example of the switch control step according to the present invention is composed of processings of Steps S21, S23 to S33.

That is, according to the above construction, a tendency to use the complex machine 1*b* lately after the second power saving mode is set is judged by the switch controller 623 (switch control step) because the complex machine 1*b* has been switched from the second power saving mode to the normal power mode the preset number of times or more in a row.

If such judgment is made, an instruction to switch the complex machine 1*b* to the third power saving mode is given by the switch controller 623 (switch control step) since the need for setting the complex machine 1*b* in the first power saving mode is through to be low during the period before the preset standby time T2 is reached (period from T1 to T2 in FIG. 8).

If the complex machine 1*b* is switched to the third power saving mode, power is supplied to the respective parts of the complex machine 1*b* at the preset constant supply amount (P3 in FIG. 8) less than the power supply amount (P1 in FIG. 8) in the first power saving mode and more than the power supply amount (P2 in FIG. 8) in the second power saving mode. Thus, power supplied to the respective parts of the complex machine 1*b* can be reduced by a supply amount corresponding to a hatched rectangular area in FIG. 8 as compared with the case where the complex machine 1*b* is switched to the first power saving mode during the entire period (period from T1 to T2 in FIG. 8).

Note that the condition indicating a high probability of instructing the switch from the second power saving mode to the normal power mode when the switch controller 623 instructs the switch to the normal power mode to the power supply controller 622 is not limited to the condition described in this embodiment.

For example, a condition indicating that a cumulative frequency of the instruction of the switch controller 623 to switch from the second power saving mode to the normal power mode to the power supply controller 622 is higher than that of the instruction of the switch controller 623 to switch from the first or third power saving mode to the normal power mode to the power supply controller 622 may be set as the condition indicating a high probability of instructing the switch from the second power saving mode to the normal power mode (this condition is referred to as a "second predetermined condition" below).

Figure 10:
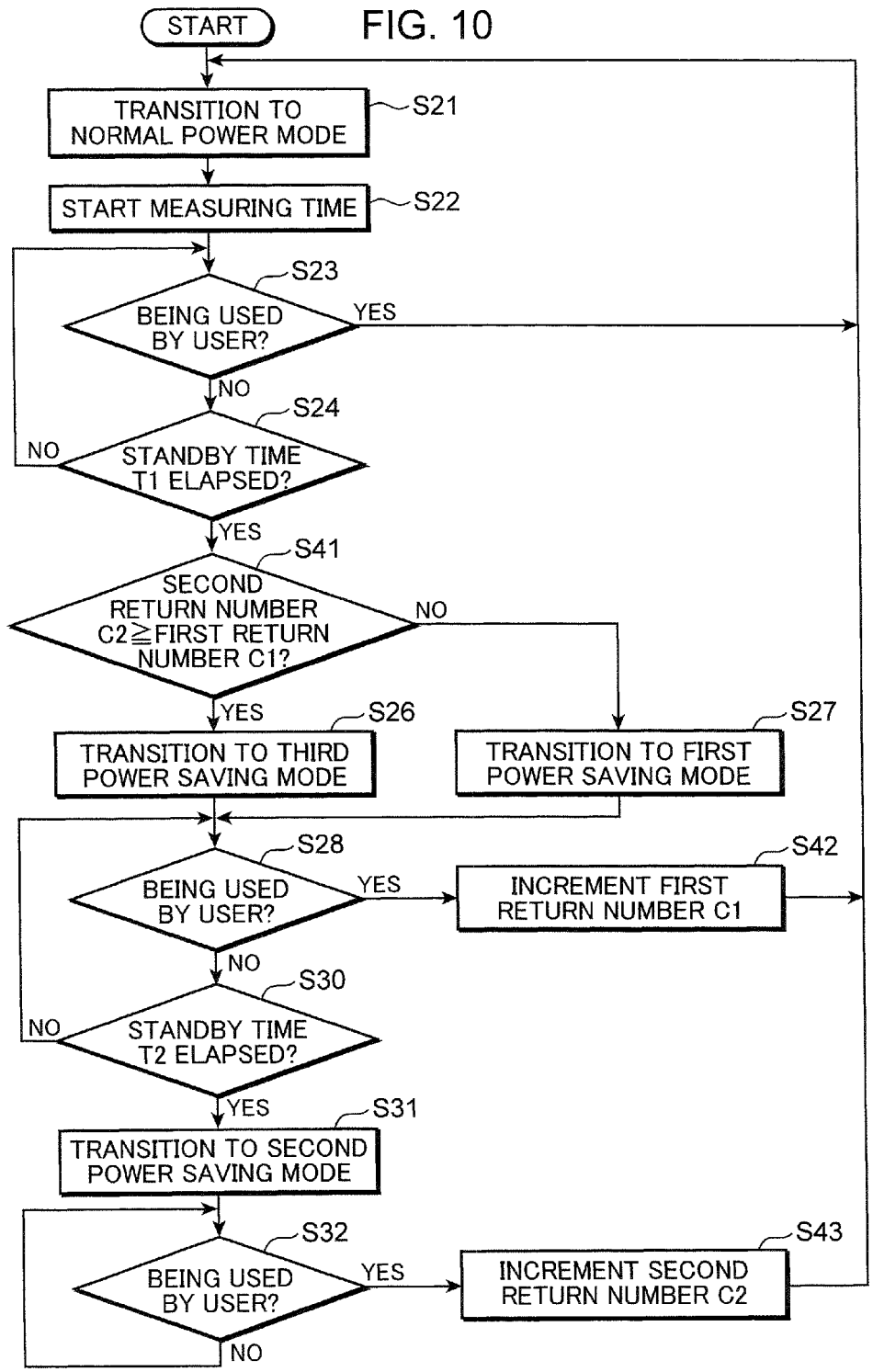
FIG. 10 is a flow chart showing a second example of operations in the power supply mode switch control in the second embodiment.

This construction can be realized by replacing Steps S25, S29 and S33 in FIG. 9 by Steps S41, S42 and S43 to be respectively described later as shown in FIG. 10.

Specifically, this construction can be realized such that a first return number C1 indicating a cumulative frequency of the instruction to switch from the first or third power saving mode to the normal power mode is incremented by 1 (S42) if the switch controller 623 instructs the switch from the first or third power saving mode to the normal power mode to the power supply controller 622 (S28; YES) and, similarly, a second return number C2 indicating a cumulative frequency of the instruction to switch from the second power saving mode to the normal power mode is incremented by 1 (S43) if the switch controller 623 instructs the switch from the second power saving mode to the normal power mode to the power supply controller 622 (S32; YES).

In accordance with this, this construction can be realized such that the switch controller 623 judges whether or not the second return number C2 is equal to or larger than the first return number C1 (S41) when the time measured by the timer 623*a* reaches the standby time T1 (S24; YES) without any instruction for a manipulation on the complex machine 1*b* being received via the user interface unit 5 and the control unit 61 (S23; NO), instructs a switch to the third power saving mode to the power supply controller 622 (S26) if the second return number C2 is equal to or larger than the first return number C1 (S41; YES) and instructs a switch to the first power saving mode to the power supply controller 622 (S27) if the second return number C2 is below the first return number C1 (S41; NO). Note that the first and second return numbers C1, C2 are read and written via the RAM in the respective processing Steps shown in FIG. 10.

According to this construction, the switch controller 623 executes a control to switch from the normal power mode to the third power saving mode instead of from the normal power mode to the first power saving mode if the cumulative frequency of the instruction to switch from the second power saving mode to the normal power mode to the power supply controller 622 is higher than that of the instruction to switch from the first or third power saving mode to the normal power mode to the power supply controller 622.

That is, a tendency to use the complex machine 1*b* after the second power saving mode is set can be judged based on the cumulative frequency in the use of the complex machine 1*b* in the past because the cumulative frequency of the instruction to switch from the second power saving mode to the normal power mode is higher than that of the instruction to switch from the first or third power saving mode to the normal power mode.

A condition that an average value of the elapsed time from the switch of the complex machine 1*b* to the second power saving mode to the switch thereof to the normal power mode when the switch controller 623 instructs the switch from the second power saving mode to the normal power mode to the power supply controller 622 is larger than that of the elapsed time from the switch of the complex machine 1*b* to the first or third power saving mode to the switch thereof to the normal power mode when the switch controller 623 instructs the switch from the first or third power saving mode to the normal power mode to the power supply controller 622 may be set as the condition indicating a high probability of instructing the switch from the second power saving mode to the normal power mode (this condition is referred to as a "third predetermined condition" below).

Figure 11:
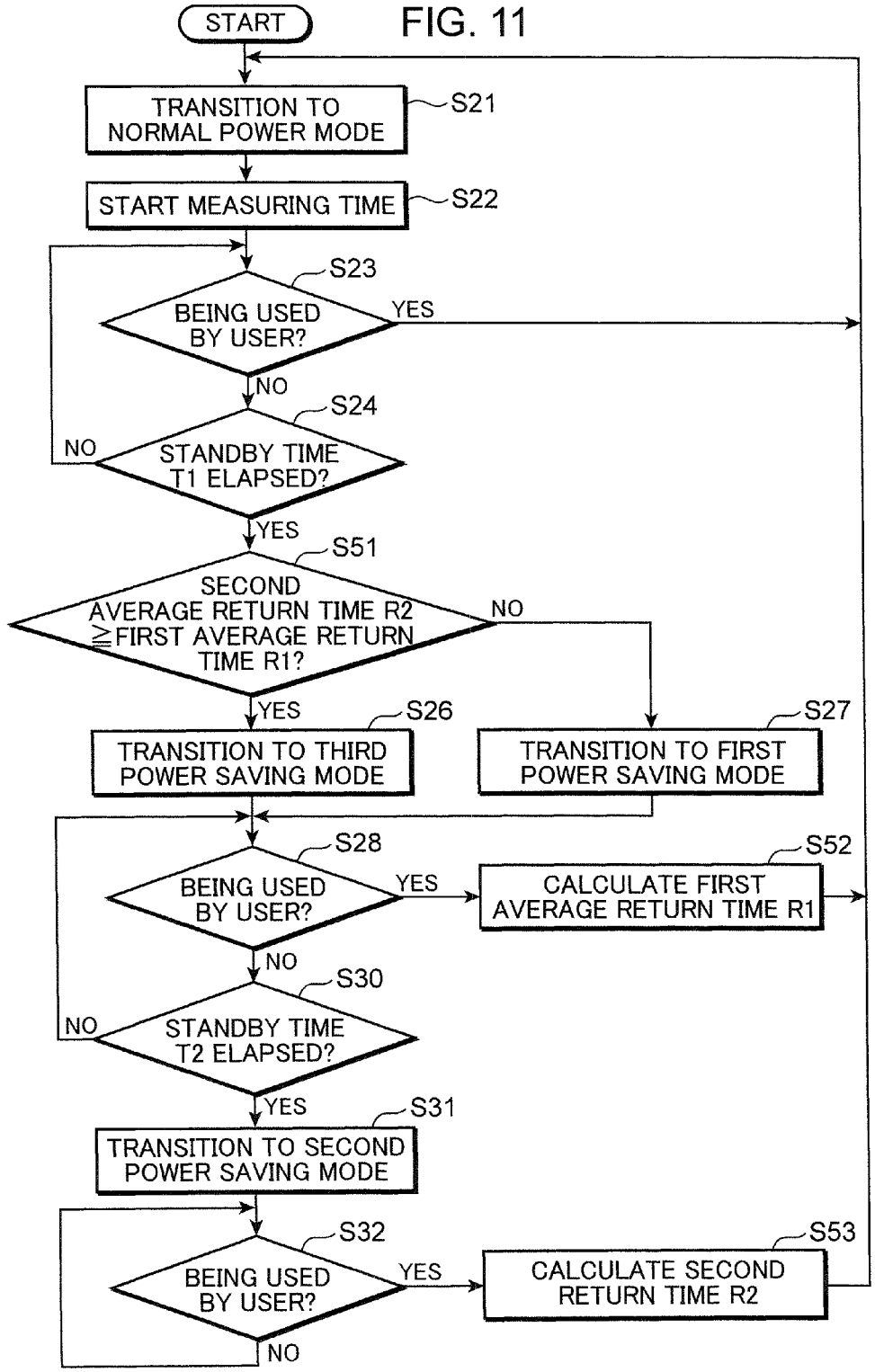
FIG. 11 is a flow chart showing a third example of operations in the power supply mode switch control in the second embodiment.

This construction can be realized by replacing Steps S25, S29 and S33 in FIG. 9 by Steps S51, S52 and S53 to be respectively described later as shown in FIG. 11.

Specifically, this construction can be realized such that the switch controller 623 calculates a first average return time R1 indicating an average value of the elapsed time from the switch to the first or third power saving mode to the switch to the normal power mode (S52) if the switch from the first or third power saving mode to the normal power mode is instructed to the power supply controller 622 (S28; YES) and calculates a second average return time R2 indicating an average value of the elapsed time from the switch to the second power saving mode to the switch to the normal power mode (S53) if the switch from the second power saving mode to the normal power mode is instructed to the power supply controller 622 (S32; YES).

Note that the first and second average return times R1, R2 are read and written via the RAM in the respective processing Steps shown in FIG. 11. Further, the first and second average return times R1, R2 can be calculated, for example, by the switch controller 623 cumulatively adding the time measured by the timer 623a in each of Steps S28 and S32 when an instruction for a manipulation on the complex machine 1b is received via the user interface unit 5 and the control unit 61, writing the cumulatively added time in correspondence with the cumulative frequency in each step, and dividing a cumulative addition result of the measured time written in the RAM by the cumulative frequency corresponding to this. However, a method for calculating the first and second average return times R1, R2 is not limited to this method.

In accordance with this, this construction can be realized such that the switch controller 623 judges whether or not the second average return time R2 is equal to or longer than the first average return time R1 (S51) if the time measured by the timer 623a reaches the standby time T1 (S24; YES) without any instruction for a manipulation on the complex machine 1b being received via the user interface unit 5 and the control unit 61 (S23; NO), instructs a switch to the third power saving mode to the power supply controller 622 (S26) if the second average return time R2 is equal to or loner than the first average return time R1 (S51; YES) and instructs a switch to the first power saving mode to the power supply controller 622 (S27) if the second average return time R2 is below the first average return time R1 (S51; NO).

According to this construction, the switch controller 623 executes a control to switch from the normal power mode to the third power saving mode instead of from the normal power mode to the first power saving mode if the average value of the elapsed time from the switch of the complex machine 1b to the second power saving mode to the switch thereof to the normal power mode is larger than that of the elapsed time from the switch of the complex machine 1b to the first or third power saving mode to the switch thereof to the normal power mode.

That is, the tendency to use the complex machine 1b after the second power saving mode is set can be judged based on the average values of the elapsed times from the switches to the first, second and third power saving modes to the switch to the normal power mode in the use of the complex machine 1b in the past because the average value of the period during which the complex machine 1b was set in the second power saving mode is larger than that of the period during which the complex machine 1b was set in the first or third power saving mode.

Note that how the power supply controller 622 switches the power supply mode to the one in which the power supply amount is less than in the first power saving mode, but more than in the second power saving mode when the switch controller 623 instructs the switch to the third power saving mode to the power supply controller 622 is not limited to the one described in this embodiment.

Figure 12:
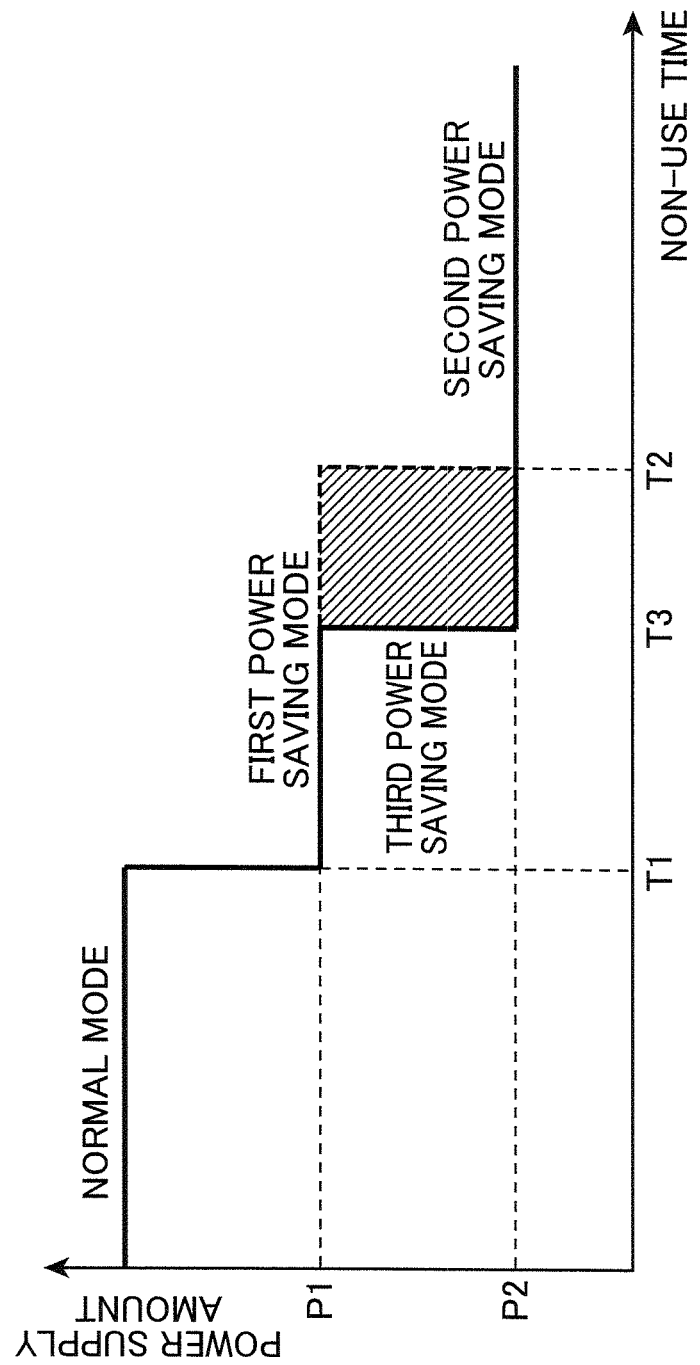
FIG. 12 is a diagram showing a second example of a change in power consumption in the respective power supply modes in the second embodiment.

For example, as shown in FIG. 12, the power supply controller 622 may supply power to the respective parts of the complex machine 1b at a supply amount equal to the power supply amount P1 in the first power saving mode during the first half (period from T1 to T3 in FIG. 12) of the entire period (period from T1 to T2 in FIG. 12) until the time measured by the timer 623a reaches the preset standby time T2 in the case of instructing the switch from the first power saving mode to the second power saving mode without any instruction for a manipulation on the complex machine 1b being received via the user interface unit 5 and the control unit 61 and at a supply amount equal to the power supply amount P2 in the second power saving mode during the second half (period from T3 to T2 in FIG. 12) when the switch to the third power saving mode is instructed from the switch controller 623.

Specifically, the period from the first standby time T1 to the second standby time T2 is divided into the first and second halves and the power in the third power saving mode is set equal to the magnitude of the power in the first power saving mode during the first half and equal to the magnitude of the power in the second power saving mode during the second half.

A time T3 as a threshold at which the entire period is divided into the first and second halves is stored as a default value beforehand in the ROM or the like provided in the storage unit 67 or the control unit 61 at the time of product shipment. Without being limited to this, a setting screen for this time T3 may be displayed on the display 51 by the user interface unit 5 and the control unit 61 and a time T3 entered on this setting screen may be stored in the RAM or the like provided in the storage unit 67 or the control unit 61.

In this case, when the complex machine 1b is switched to the third power saving mode, power supplied to the respective parts of the complex machine 1b can be reduced by a supply amount corresponding to a hatched area in FIG. 12 as compared with the case where the first power saving mode is switched during the entire period (period from T1 to T2 in FIG. 12) until the time measured by the timer 623a reaches the preset standby time T2 in the case of instructing the switch from the first power saving mode to the second power saving mode without any instruction for a manipulation on the complex machine 1b being received via the user interface unit 5 and the control unit 61.

Figure 13:
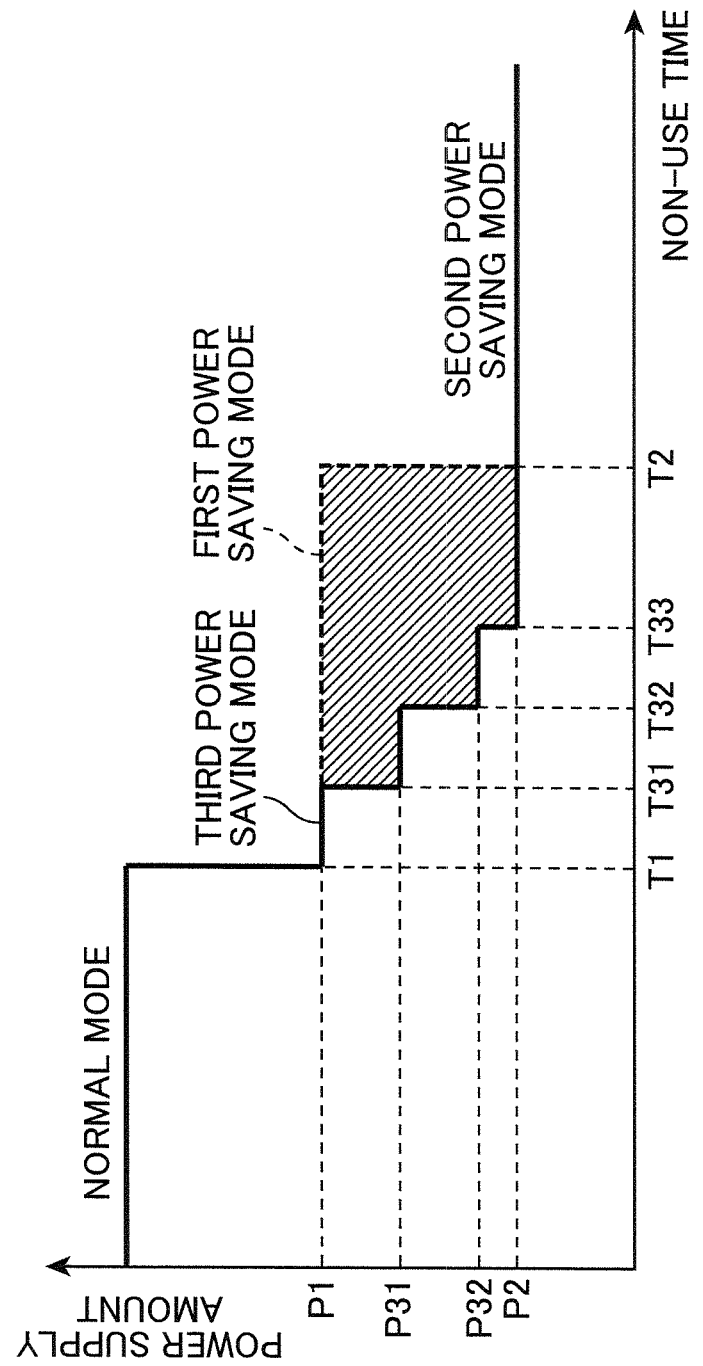
FIG. 13 is a diagram showing a third example of a change in power consumption in the respective power supply modes in the second embodiment.

Alternatively, for example, as shown in FIG. 13, the power supply controller 622 may divide a period (period from T1 to T2 in FIG. 13) until the time measured by the timer 623a reaches the preset standby time T2 in the case of instructing the switch from the first power saving mode to the second power saving mode without any instruction for a manipulation on the complex machine 1b being received via the user interface unit 5 and the control unit 61 into a predetermined number of periods, e.g. four periods: a period from T1 to T31, a period from T31 to T32, a period from T32 to T33 and a period from T33 to T2 in FIG. 13 and supply power to the respective parts of the complex machine 1b at supply amounts P1, P31, P32 and P2 which are set beforehand to decrease every time the divided period elapses and equal to or less than the power supply amount P1 in the first power saving mode and equal to or more than the power supply amount P2 in the second power saving mode when the switch to the third power saving mode is instructed from the switch controller 623.

Specifically, the power in the third power saving mode is set equal to or less than that in the first power saving mode and equal to or more than that in the second power saving mode, the period of the third power saving mode is divided into the predetermined number of periods, and the power in the third power saving mode is reduced every time the divided period elapses.

In these cases, when the complex machine 1b is switched to the third power saving mode, power supplied to the respective parts of the complex machine 1b can be reduced by the supply amount corresponding to a hatched area in FIG. 13 in a stepwise manner according to the passage of time as compared with the case where the first power saving mode is switched during the entire period (period from T1 to T2 in FIG. 13) until the time measured by the timer 623a reaches the preset standby time T2 in the case of instructing the switch from the first power saving mode to the second power saving mode without any instruction for a manipulation on the complex machine 1*b* being received via the user interface unit 5 and the control unit 61.

Further, the standby times T1, T2 in this embodiment and the conditions indicating a high probability of instructing the switch from the second power saving mode to the normal power mode may be set in each preset time period of day.

According to this construction, for example, in late night and early-morning hours during which the complex machine 1*b* is thought to be used less frequently, the standby times T1, T2 are set to be shorter and the condition indicating a high probability of instructing the switch from the second power saving mode to the normal power mode is set at the second or third predetermined condition, whereby the power supply amount can be reduced by making the transition to the second power saving mode easier based on the past used state of the complex machine 1*b* in these time periods of day. Alternatively, in midday hours during which the complex machine 1*b* is thought to be used more frequently, the standby times T1, T2 are set to be longer and the condition indicating a high probability of instructing the switch from the second power saving mode to the normal power mode is set at the first predetermined condition, whereby a time required for the transition to the normal power mode can be reduced by making the transition to the second power saving mode difficult based on the recent used state of the complex machine 1*b*, e.g. by making it possible to quickly heat the fixing roller 451 to a predetermined fixing temperature. That is, the power supply amount can be flexibly reduced according to the used state of the complex machine 1*b* in each time period of day.

As described above, according to the second embodiment, it is judged by the switch controller 623 (switch control step) whether or not the condition indicating a high probability of instructing the switch from the second power saving mode to the normal power mode is satisfied when the switch from the first and second power saving modes to the normal power mode is instructed.

In such a state where the probability of instructing the switch from the second power saving mode to the normal power mode is judged to be high, the switch controller 623 (switch control step) executes a control to switch from the normal power mode to the third power saving mode in which the power supply amount is less than in the first power saving mode, but more than in the second power saving mode instead of from the normal power mode to the first power saving mode.

That is, in the case of a high probability of instructing the switch from the second power saving mode to the normal power mode, the need for setting the complex machine 1*b* in the first power saving mode is thought to be low during a period until the predetermined standby time is reached. Thus, by switching the complex machine 1*b* to the third power saving mode during this period, power supplied to the respective parts of the complex machine 1*b* can be reduced as compared with the case where the complex machine 1*b* is switched to the first power saving mode during this period.

Further, the complex machine 1*b* according to the second embodiment is provided with the image forming unit 40 including the fixing device 45 for heating a toner image at a preset temperature and fixing it to a recording medium, the fixing temperature of the fixing device 45 in the first power saving mode is set to be lower than the preset temperature, the fixing temperature of the fixing device 45 in the second power saving mode is set to be lower than that in the first power saving mode, and the fixing temperature of the fixing device 45 in the third power saving mode is set to be lower than that in the first power saving mode and higher than that in the second power saving mode.

In the case where a switch is made from the normal power mode to the first power saving mode when the first standby time T1 is reached and a switch is made from the first power saving mode to the second power saving mode when the second standby time T2 is reached, the amount of power consumption of the complex machine 1*b* is more than in the case where a switch is made form the normal power mode to the second power saving mode when the first standby time T1 is reached. Thus, it is thought to switch from the normal power mode to the second power saving mode by omitting the first power saving mode when the probability of the number of times of performing the second power saving mode and/or the probability of the period of the second power saving mode is/are higher than the probability of the number of times of performing the power saving mode other than the second power saving mode and/or the probability of the period of the power saving mode other than the second power saving mode.

However, since the temperature of the fixing device 45 is set to be relatively low (e.g. room temperature or 50 to 80° C.) in the second power saving mode, a relatively long time is required before the temperature of the fixing device 45 reaches the fixing temperature (e.g. 180 to 200° C.). This time has a duration which causes the user to feel stress. Accordingly, the time until the temperature of the fixing device 45 reaches the fixing temperature can be shortened as compared with the second power saving mode while suppressing the amount of power consumption of the complex machine 1*b* as compared with the first power saving mode by switching from the normal power mode to the third power saving mode when the first standby time is reached.

As described above, according to the complex machines 1*a*, 1*b* and the power supply control methods according to the first and second embodiment, the first power saving mode is omitted and a switch is made to the power saving mode (second or third power saving mode) in which the power supply amount is reduced as compared with the first power saving mode when the time measured by the timer 613*a*, 623*a* reaches the first standby time T1 if the predetermined condition is satisfied. Thus, further power saving can be realized according to the used state of the complex machine 1*a*, 1*b*.

The predetermined condition in the first embodiment is that a manipulation performed on the complex machine 1*a* after the switch from the first or second power saving mode to the normal power mode has not been the one for causing the image forming unit 40 to form an image the preset number of times or more in a row. The predetermined condition in the second embodiment is that the probability of the number of times of performing the second power saving mode and/or the probability of the period of the second power saving mode is/are higher than the probability of the number of times of performing the power saving mode other than the second power saving mode and/or the probability of the period of the power saving mode other than the second power saving mode.

Although the complex machine has been described as an example of an electrical apparatus in the first and second embodiments, the electrical apparatus is not limited to this and may be an image forming apparatus such as a printer, a copier, a scanner or a facsimile machine, a personal computer or an other electrical apparatus.

Note that the constructions and settings shown in FIGS. 1 to 13 in the first and second embodiments are merely examples and not of the nature to limit the present invention to these embodiments.

This application is based on Japanese Patent application Nos. 2010-171570 and 2010-171698 filed in Japan Patent Office on Jul. 30, 2010, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An electrical apparatus, comprising:
    a power supply controller for switching a power supply mode between a normal power mode for supplying power to respective parts of the electrical apparatus, a first power saving mode for reducing a power supply amount as compared with the normal power mode and a second power saving mode for reducing the power supply amount as compared with the first power saving mode;
    a time meter which starts measuring time when the execution of an operation of the electrical apparatus based on a manipulation on the electrical apparatus is completed in a state where the electrical apparatus is set in the normal power mode;
    a manipulation instruction receiver for receiving an instruction for a manipulation on the electrical apparatus; and
    a switch controller for instructing a switch to the first power saving mode to the power supply controller when a state where no instruction for the manipulation is received by the manipulation instruction receiver continues and the time measured by the time meter reaches a preset first standby time in the normal power mode, a switch to the second power saving mode to the power supply controller when the state where no instruction for the manipulation is received by the manipulation instruction receiver continues and the time measured by the time meter reaches a preset second standby time in the first power saving mode, and a switch from the first or second power saving mode to the normal power mode when an instruction for the manipulation is received by the manipulation instruction receiver in a state where the electrical apparatus is set in the first or second power saving mode;
    wherein the switch controller omits the first power saving mode and instructs a switch to a third power saving mode as a power supply mode in which the power supply amount is less than in the first power saving mode, but more than in the second power saving mode when the time measured by the time meter reaches the first standby time if a predetermined condition is satisfied;
    the electrical apparatus is an image forming apparatus and comprises an image forming unit including a fixing device for heating a toner image at a preset temperature and fixing the toner image to a recording medium;
    the power supply controller switches the power supply mode between the normal power mode for supplying power to the respective parts including the image forming unit, the first power saving mode for reducing the power supply amount as compared to the normal power mode by setting the temperature of the fixing device at a temperature lower than the preset temperature and the second power saving mode for reducing the power supply amount as compared to the first power saving mode by setting the temperature of the fixing device at a temperature lower than the temperature in the first power saving mode; and
    the predetermined condition is that a manipulation performed on the image forming apparatus has not been a manipulation for causing the image forming unit to form an image a preset number of times or more in a row after the switch from the first or second power saving mode to the normal power mode.

2. An electrical apparatus according to claim 1, wherein the power supply controller sets power in the third power saving mode to be less than that in the first power saving mode and more than that in the second power saving mode and to be constant during the entire period of the third power saving mode.

3. An electrical apparatus according to claim 1, wherein the power supply controller divides a period from the first standby time to the second standby time into first and second halves, and sets power to the first power saving mode during the first half and sets power to the second power saving mode during the second half.

4. An electrical apparatus according to claim 1, wherein the power supply controller sets power in the third power saving mode to be less than that in the first power saving mode and more than that in the second power saving mode, divides the period of the third power saving mode into a predetermined number of periods, and reduces the power in the third power saving mode every time the divided period elapses.

5. An electrical apparatus according to claim 1, wherein:
    the temperature of the fixing device in the third power saving mode is set to be lower than that in the first power saving mode and higher than that in the second power saving mode.

6. An electrical apparatus according to claim 1, wherein the switch controller instructs a switch of the power supply mode to the power supply controller based on the first and second standby times and the predetermined condition is based on the time of day.

7. An electrical apparatus comprising:
    a power supply controller for switching a power supply mode between a normal power mode for supplying power to respective parts of the electrical apparatus, a first power saving mode for reducing a power supply amount as compared with the normal power mode and a second power saving mode for reducing the power supply amount as compared with the first power saving mode;
    a time meter which starts measuring time when the execution of an operation of the electrical apparatus based on a manipulation on the electrical apparatus is completed in a state where the electrical apparatus is set in the normal power mode;
    a manipulation instruction receiver for receiving an instruction for a manipulation on the electrical apparatus; and
    a switch controller for instructing a switch to the first power saving mode to the power supply controller when a state where no instruction for the manipulation is received by the manipulation instruction receiver continues and the time measured by the time meter reaches a preset first standby time in the normal power mode, a switch to the second power saving mode to the power supply controller when the state where no instruction for the manipulation is received by the manipulation instruction receiver continues and the time measured by the time meter reaches a preset second standby time in the first power saving mode, and a switch from the first or second power saving mode to the normal power mode when an instruction for the manipulation is received by the manipulation instruction receiver in a state where the electrical apparatus is set in the first or second power saving mode;

wherein the switch controller omits the first power saving mode and instructs a switch to the second power saving mode when the time measured by the time meter reaches the first standby time if a predetermined condition is satisfied;

the electrical apparatus is an image forming apparatus and comprises an image forming unit including a fixing device for heating a toner image at a preset temperature and fixing it to a recording medium;

the power supply controller switches the power supply mode between the normal power mode for supplying power to respective parts including the image forming unit, the first power saving mode for reducing the power supply amount as compared with the normal power mode by setting the temperature of the fixing device at a temperature lower than the preset temperature and the second power saving mode for reducing the power supply amount as compared with the first power saving mode by setting the temperature of the fixing device at a temperature lower than that in the first power saving mode; and the predetermined condition is that a manipulation performed on the image forming apparatus has not been the one for causing the image forming unit to form an image a preset number of times or more in a row after the switch from the first or second power saving mode to the normal power mode.

8. An electrical apparatus according to claim 7, further comprising an image reader for reading a document, wherein:
the manipulation that does not cause the image forming unit to form an image is the one for causing the image reader to read a document but not causing the image forming unit to form an image.

9. An electrical apparatus according to claim 7, wherein:
the switch controller gives a first instruction to request a switch from the second power saving mode to the first power saving mode instead of the switch from the second power saving mode to the normal power mode when the manipulation instruction receiver receives an instruction for the manipulation in the state where the electrical apparatus is set in the second power saving mode;

a second time meter starts measuring time when the electrical apparatus is set to the first power saving mode in accordance with the first instruction; and the switch controller instructs a switch to the second power saving mode to the power supply controller when the state where no instruction for the manipulation is received by the manipulation instruction receiver continues and the time measured by the second time meter reaches a preset standby time in a state where the electrical apparatus is set in the first power saving mode in accordance with the first instruction and instructs a switch to the normal power mode to the power supply controller when the manipulation instruction receiver receives an instruction for the manipulation.

10. An electrical apparatus, comprising:
a power supply controller for switching a power supply mode between a normal power mode for supplying power to respective parts of the electrical apparatus, a first power saving mode for reducing a power supply amount as compared with the normal power mode and a second power saving mode for reducing the power supply amount as compared with the first power saving mode;

a time meter that starts measuring time when the execution of an operation of the electrical apparatus based on a manipulation on the electrical apparatus is completed in a state where the electrical apparatus is set in the normal power mode;

a manipulation instruction receiver for receiving an instruction for a manipulation on the electrical apparatus; and a switch controller for instructing a switch to the first power saving mode to the power supply controller when a state where no instruction for the manipulation is received by the manipulation instruction receiver continues and the time measured by the time meter reaches a preset first standby time in the normal power mode, a switch to the second power saving mode to the power supply controller when the state where no instruction for the manipulation is received by the manipulation instruction receiver continues and the time measured by the time meter reaches a preset second standby time in the first power saving mode, and a switch from the first or second power saving mode to the normal power mode when an instruction for the manipulation is received by the manipulation instruction receiver in a state where the electrical apparatus is set in the first or second power saving mode;

wherein the switch controller omits the first power saving mode and instructs a switch to a third power saving mode as a power supply mode in which the power supply amount is less than in the first power saving mode, but more than in the second power saving mode when the time measured by the time meter reaches the first standby time if a predetermined condition is satisfied, and the predetermined condition exists when the switch controller has instructed the switch from the second power saving mode to the normal power mode to the power supply controller a preset number of times or more in a row.

11. An electrical apparatus, comprising:
a power supply controller for switching a power supply mode between a normal power mode for supplying power to respective parts of the electrical apparatus, a first power saving mode for reducing a power supply amount as compared with the normal power mode and a second power saving mode for reducing the power supply amount as compared with the first power saving mode;

a time meter that starts measuring time when the execution of an operation of the electrical apparatus based on a manipulation on the electrical apparatus is completed in a state where the electrical apparatus is set in the normal power mode;

a manipulation instruction receiver for receiving an instruction for a manipulation on the electrical apparatus; and a switch controller for instructing a switch to the first power saving mode to the power supply controller when a state where no instruction for the manipulation is received by the manipulation instruction receiver continues and the time measured by the time meter reaches a preset first standby time in the normal power mode, a switch to the second power saving mode to the power supply controller when the state where no instruction for the manipulation is received by the manipulation instruction receiver continues and the time measured by the time meter reaches a preset second standby time in the first power saving mode, and a switch from the first or second power saving mode to the normal power mode when an instruction for the manipulation is received by the manipulation instruction receiver in a state where the electrical apparatus is set in the first or second power saving mode;

wherein the switch controller omits the first power saving mode and instructs a switch to a third power saving mode as a power supply mode in which the power supply amount is less than in the first power saving mode, but more than in the second power saving mode when the time measured by the time meter reaches the first standby time if a predetermined condition is satisfied, and the predetermined condition exists when there are more instructions to switch from the second power saving mode to the normal power mode than instructions to switch from either the first or third power saving mode to the normal power mode.

12. An electrical apparatus, comprising:

a power supply controller for switching a power supply mode between a normal power mode for supplying power to respective parts of the electrical apparatus, a first power saving mode for reducing a power supply amount as compared with the normal power mode and a second power saving mode for reducing the power supply amount as compared with the first power saving mode;

a time meter which starts measuring time when the execution of an operation of the electrical apparatus based on a manipulation on the electrical apparatus is completed in a state where the electrical apparatus is set in the normal power mode;

a manipulation instruction receiver for receiving an instruction for a manipulation on the electrical apparatus; and a switch controller for instructing a switch to the first power saving mode to the power supply controller when a state where no instruction for the manipulation is received by the manipulation instruction receiver continues and the time measured by the time meter reaches a preset first standby time in the normal power mode, a switch to the second power saving mode to the power supply controller when the state where no instruction for the manipulation is received by the manipulation instruction receiver continues and the time measured by the time meter reaches a preset second standby time in the first power saving mode, and a switch from the first or second power saving mode to the normal power mode when an instruction for the manipulation is received by the manipulation instruction receiver in a state where the electrical apparatus is set in the first or second power saving mode;

wherein the switch controller omits the first power saving mode and instructs a switch to a third power saving mode as a power supply mode in which the power supply amount is less than in the first power saving mode, but more than in the second power saving mode when the time measured by the time meter reaches the first standby time if a predetermined condition is satisfied, and the predetermined condition exists when an average value of elapsed time from the switch of the electrical apparatus to the second power saving mode to the switch thereof to the normal power mode when the switch is made to the second power saving mode is larger than that of elapsed time from the switch of the electrical apparatus to either the first or third power saving mode to the switch thereof to the normal power mode when the switch is not made to the second power saving mode.

13. A power supply control method, comprising:

a time measuring step of starting measuring time when the execution of an operation of an electrical apparatus based on an instruction for a manipulation on the electrical apparatus is completed in a normal power mode for supplying power to respective parts of the electrical apparatus;

a first switch control step of switching from the normal power mode to a first power supply mode for reducing the amount of power supplied to the electrical apparatus as compared with the normal power mode when a state where no instruction for the manipulation is given continues and the time measured in the time measuring step reaches a preset first standby time in the normal power mode;

a second switch control step of switching from the first power saving mode to a second power supply mode for reducing a power supply amount to the electrical apparatus as compared with the first power saving mode when the state where no instruction for the manipulation is given continues and the time measured in the time measuring step reaches a preset second standby time in the first power saving mode; and a third switch control step of switching from the first or second power saving mode to the normal power mode when an instruction for the manipulation is given in the first or second power saving mode; wherein:

the first switch control step includes a step of omitting the first power saving mode and switching to the second power saving mode or omitting the first power saving mode and switching to a third power saving mode as a power supply mode in which the power supply amount is less than in the first power saving mode, but more than in the second power saving mode when the time measured in the time measuring step reaches the first standby time if a predetermined condition is satisfied;

the electrical apparatus includes an image forming unit with a fixing device for heating a toner image at a preset temperature and fixing it to a recording medium;

the first power saving mode is a mode for reducing the power supply amount as compared with the normal power mode by setting the temperature of the fixing device at a temperature lower than the preset temperature;

the second power saving mode is a mode for reducing the power supply amount as compared with the first power saving mode by setting the temperature of the fixing device at a temperature lower than that in the first power saving mode;

the predetermined condition is that a manipulation performed on the electrical apparatus has not been the one for causing the image forming unit to form an image a preset number of times or more in a row after the switch to the normal power mode in the third switch control step; and the switch is made to the second power saving mode by omitting the first power saving mode.

* * * * *